(12) United States Patent
Fukuda

(10) Patent No.: US 9,253,446 B2
(45) Date of Patent: Feb. 2, 2016

(54) INFORMATION PROVIDING APPARATUS, PORTABLE INFORMATION TERMINAL, CONTENT PROCESSING DEVICE, DEVICE CONTROL APPARATUS, CONTENT PROCESSING SYSTEM AND PROGRAM

(75) Inventor: Kazuhiro Fukuda, Kanagawa (JP)

(73) Assignee: Sony Corporation (JP)

( * ) Notice: Subject to any disclaimer, the term of this patent is extended or adjusted under 35 U.S.C. 154(b) by 432 days.

(21) Appl. No.: 12/387,757

(22) Filed: May 7, 2009

(65) Prior Publication Data

US 2009/0282001 A1 Nov. 12, 2009

(30) Foreign Application Priority Data

May 9, 2008 (JP) ................................ P2008-123787

(51) Int. Cl.
| | |
|---|---|
| *H04N 21/00* | (2011.01) |
| *H04N 7/173* | (2011.01) |
| *H04H 60/32* | (2008.01) |
| *H04H 60/46* | (2008.01) |
| *H04H 60/72* | (2008.01) |
| *H04H 60/91* | (2008.01) |

(Continued)

(52) U.S. Cl.
CPC ........... *H04N 7/17318* (2013.01); *H04H 60/32* (2013.01); *H04H 60/46* (2013.01); *H04H 60/72* (2013.01); *H04H 60/91* (2013.01); *H04N 7/165* (2013.01); *H04N 21/254* (2013.01); *H04N 21/25891* (2013.01); *H04N 21/2668* (2013.01); *H04N 21/4126* (2013.01); *H04N 21/4227* (2013.01); *H04N 21/4828* (2013.01)

(58) Field of Classification Search
CPC ...................................................... H04N 21/60

USPC ............................................................ 725/39
See application file for complete search history.

(56) References Cited

U.S. PATENT DOCUMENTS

| | | | |
|---|---|---|---|
| 2001/0046366 A1 | 11/2001 | Susskind | |
| 2002/0151327 A1* | 10/2002 | Levitt ............................. | 455/556 |

(Continued)

FOREIGN PATENT DOCUMENTS

| | | |
|---|---|---|
| DE | 10310746 A1 | 12/2004 |
| EP | 1204275 A2 | 5/2002 |

(Continued)

OTHER PUBLICATIONS

Office Action from Japanese Application No. 2008-123787, dated Apr. 27, 2010.

(Continued)

*Primary Examiner* — Grace Park
(74) *Attorney, Agent, or Firm* — Lerner, David, Littenberg, Krumholz & Mentlik, LLP

(57) ABSTRACT

A content list including contents processable by a designated processing device, among the contents to be processed including a specific content managed with respect to each user, is received by a portable terminal from an ECG server, and a content is selected by a user. Then, a processing request for the selected content is transmitted from the portable terminal to the designated device via the ECG server and a device control server, and unit information of the selected content is acquired by the portable terminal and displayed or reproduced. A user can thereby use the content and the unit information by selecting the content using the portable terminal without depending on the content and the processing device.

18 Claims, 19 Drawing Sheets

(51) Int. Cl.
*H04N 7/16* (2011.01)
*H04N 21/254* (2011.01)
*H04N 21/258* (2011.01)
*H04N 21/2668* (2011.01)
*H04N 21/41* (2011.01)
*H04N 21/4227* (2011.01)
*H04N 21/482* (2011.01)

(56) References Cited

U.S. PATENT DOCUMENTS

| | | |
|---|---|---|
| 2004/0172561 A1* | 9/2004 | Iga ................................ 713/201 |
| 2005/0028208 A1* | 2/2005 | Ellis et al. ...................... 725/58 |
| 2005/0055716 A1 | 3/2005 | Louie et al. |
| 2006/0101498 A1* | 5/2006 | Arling et al. ................... 725/81 |
| 2007/0101376 A1* | 5/2007 | Otsu et al. ...................... 725/86 |
| 2007/0113246 A1 | 5/2007 | Xiong |
| 2007/0208718 A1 | 9/2007 | Javid et al. |

FOREIGN PATENT DOCUMENTS

| | | |
|---|---|---|
| JP | 2005031804 A | 2/2005 |
| JP | 2005033328 A | 2/2005 |
| JP | 2005354642 A | 12/2005 |
| JP | 2006-227843 A | 8/2006 |
| JP | 2009225070 A | 10/2009 |
| JP | 2009246497 A | 10/2009 |
| JP | 5090246 | 9/2012 |

OTHER PUBLICATIONS

European Search Report, EP 09159629, dated Oct. 5, 2009.

* cited by examiner

FIG.7A

```
<content id="c9999" name="PROFESSIONAL STYLE" genre="DOCUMENTARY" synopsis="INTRODUCING PROFESSIONALS OF VARIOUS FIELDS IN THE WORLD" start_data="2007/7/1" start_time="22:00:00" end_time="23:00:00">
<keywords data="AAA WORK IMPRESSION"/>
<ECG_Reference url="http:/ecg_db/" ref_id="u5555"/>
<CreditsList>
<Person id="1_1" name="AAA" person_master_id="pppp00101"/>
<Person id="1_2" name="BBB" person_master_id="pppp00102"/>
<Person id="1_3" name="CCC" person_master_id="pppp00103"/>
<Person id="1_4" name="DDD" person_master_id="pppp00104"/>
</CreditsList>
</content>
```

FIG.7B

```
<ECG_unit id="u5555">
<ECG_content_list>
<ECG_item title="MC AAA" priority="low" type="person" presentation_type="p1" imageURL="http:/image/aaa.png" text="http:/text/a.txt"/>
<ECG_item title="GUEST BBB" priority="high" type="person" presentation_type="p1" imageURL="http:/image/bbb.png" text="http:/text/b.txt"/>
</ECG_content_list>
<ECG_Reference_list>
<ECG_item title="PROFESSIONAL STYLE DVD PACKAGE" priority="high" type="DVD" presentation_type="p1" imageURL="http:/image/ccc.png" text="http:/text/c.txt" QR_code="http:/QR/111"/>
</ECG_Reference_list>
</ECG_unit>
```

INFORMATION PROVIDING APPARATUS, PORTABLE INFORMATION TERMINAL, CONTENT PROCESSING DEVICE, DEVICE CONTROL APPARATUS, CONTENT PROCESSING SYSTEM AND PROGRAM

The present application claims priority from Japanese Patent Application No. JP 2008-123787 filed in the Japanese Patent Office on May 9, 2008, the entire content of which is incorporated herein by reference.

BACKGROUND OF THE INVENTION

1. Field of the Invention

The present invention relates to an information providing apparatus, a portable information terminal, a content processing device, a device control apparatus, a content processing system and a program.

2. Description of the Related Art

Content providers provide users with various contents using various kinds of service models and recording media today. On the other hand, users use contents using various kinds of content processing devices such as television terminals, set-top boxes (STB), personal video recorders (PVR), various recording and reproducing apparatus and personal computers. Thus, a user selects and uses a content with use of a content processing device capable of performing processing such as viewing, recording, reproduction, viewing reservation and recording reservation, for example, according to the type of the content.

Further, a content processing device that has a function to acquire and display or reproduce content information related to the content such as electronic program guide (EPG) information and data broadcast information, for example, together with or separately from the acquisition of the content is known.

Further, a content processing device that has a history management function to support selection of the content by accumulating the history information of the contents selected by a user, a content processing device that has a content recommendation function to analyze the preference of a user based on history information and recommend the content matching the preference to the user are known.

SUMMARY OF THE INVENTION

However, if there are a large variety of contents and content processing devices, a user may feel it burdensome to select contents, content information and so on with respect to each processing device. Particularly, a user feels burdensome when an operating method of a processing device is complicated or when an operating method is different among different processing devices.

Further, because history information is accumulated with respect to each processing device and preferences are not managed in a centralized manner among processing devices, a user may feel inconvenience when using the history management function and the content recommendation function. Particularly, the accumulated history information and preference information are unavailable during update of the content processing device, which makes a user feel inconvenience.

In light of the foregoing, it is desirable to provide information providing apparatus, portable information terminal, content processing device, device control apparatus, content processing system and program that enable improvement in convenience for content selection and processing.

According to a first embodiment of the present invention, there is provided an information providing apparatus included in a content processing system made up of the information providing apparatus, a portable information terminal, a content processing device and a device control apparatus connectable through a communication network, to process a content by at least one content processing device using the portable information terminal via the information providing apparatus and the device control apparatus. The information providing apparatus includes a content information storage portion to store content information containing unit identification information for identifying unit information of a content to be processed; a management information storage portion to store management information for identifying a specific content managed with respect to each user of the portable information terminal; a unit information storage portion to store the unit information containing the content information and, selectively, related information related to the content information in association with the content; a designated device information receiving portion to receive designated device information for identifying the content processing device to perform content processing from the portable information terminal; a device information receiving portion to receive device information for specifying content processing executable by a designated device from the device control apparatus; a content information extracting portion to extract the content information of the content processable by the designated device from the content information storage portion based on the device information, and extract the content information of the content processable by the designated device, among specific contents managed with respect to each user of the portable information terminal, from the content information storage portion based on the device information and the management information; a content list processing portion to create a content list including the contents corresponding to the extracted content information and transmit the content list to the portable information terminal; a content selection information transmitting/receiving portion to receive content selection information for identifying a selected content selected based on the content list from the portable information terminal and transmit the content selection information to the content processing device via the device control apparatus; a processing request transmitting/receiving portion to receive a processing request indicating content processing to be performed on the selected content from the portable information terminal and transmit the processing request to the designated device via the device control apparatus; a unit information processing portion to extract the unit information of the selected content from the unit information storage portion based on the unit identification information contained in the content information of the selected content and provide the unit information to the portable information terminal; and a management information processing portion to store the management information for identifying the selected content into the management information storage portion.

In this configuration, the content list including the content processable by the designated device, among the contents to be processed including a specific content managed with respect to each user, is created, and the content is selected by a user through the portable information terminal. Then, the processing request for the selected content is transmitted to the designated device, and the unit information of the selected content is provided to the portable information terminal. Further, the selected content is managed with respect to each user as the specific content. A content provider can thereby provide the content and the unit information to a user by allowing a user to select the content without depending on the content and the content processing device.

According to a second embodiment of the present invention, there is provided a portable information terminal included in a content processing system made up of an information providing apparatus, the portable information terminal, a content processing device and a device control apparatus connectable through a communication network, to process a content by at least one content processing device using the portable information terminal via the information providing apparatus and the device control apparatus. In the content processing system, content information containing unit identification information for identifying unit information of a content to be processed is stored in the information providing apparatus, management information for identifying a specific content managed with respect to each user of the portable information terminal is stored in the information providing apparatus, and the unit information containing the content information and, selectively, related information related to the content information is stored in association with the content in the information providing apparatus. The portable information terminal includes a designated device information transmitting portion to transmit designated device information for identifying the content processing device to perform content processing to the information providing apparatus; a content list receiving portion to acquire a content list including the content corresponding to the content information of a content processable by a designated device and extracted based on device information indicating content processing executable by the designated device and the content corresponding to the content information of a specific content managed with respect to each user of the portable information terminal and processable by the designated device and extracted based on the device information and the management information from the information providing apparatus; a content selection information transmitting portion to transmit content selection information for identifying a selected content selected based on the content list to the designated device via the information providing apparatus and the device control apparatus; a processing request transmitting portion to transmit a processing request indicating content processing to be performed on the selected content to the designated device via the information providing apparatus and the device control apparatus; a unit information processing portion to acquire unit information extracted as the unit information of the selected content based on the unit identification information contained in the content information of the selected content from the information providing apparatus and process the unit information; and a display/reproducing portion to display or reproduce the content list and the unit information.

In this configuration, the content list including the content processable by the designated device, among the contents to be processed including a specific content managed with respect to each user, is received, and the content is selected by a user. Then, the processing request for the selected content is transmitted to the designated device, and the unit information of the selected content is acquired and displayed or reproduced. A user can thereby use the content and the unit information using the portable information terminal by selecting the content without depending on the content and the content processing device.

According to a third embodiment of the present invention, there is provided a content processing device included in a content processing system made up of an information providing apparatus, a portable information terminal, the content processing device and a device control apparatus connectable through a communication network, to process a content by at least one content processing device using the portable information terminal via the information providing apparatus and the device control apparatus, and designated as a designated device to perform content processing by the portable information terminal. In the content processing system, content information containing unit identification information for identifying unit information of a content to be processed is stored in the information providing apparatus, and management information for identifying a specific content managed with respect to each user of the portable information terminal is stored in the information providing apparatus. The content processing device includes a content selection information receiving portion to receive content selection information for identifying a selected content selected by the portable information terminal based on a content list including the content corresponding to the content information of a content processable by the designated device and extracted based on device information indicating content processing executable by the designated device and the content corresponding to the content information of a specific content managed with respect to each portable information terminal and processable by the designated device and extracted based on the device information and the management information from the portable information terminal via the information providing apparatus and the device control apparatus; a processing request receiving portion to receive a processing request indicating content processing to be performed on the selected content from the portable information terminal via the information providing apparatus and the device control apparatus; and a content processing portion to perform processing on the selected content based on the received content selection information and the received processing request.

In this configuration, the content is selected by a user through the portable information terminal based on the content list including the content processable by the designated device, among the contents to be processed including a specific content managed with respect to each user. Then, the processing request for the selected content is received by the designated device, and content processing is performed. A user can thereby use the content with the content processing device by selecting the content without depending on the content and the content processing device.

According to a fourth embodiment of the present invention, there is provided a device control apparatus included in a content processing system made up of an information providing apparatus, a portable information terminal, a content processing device and the device control apparatus connectable through a communication network, to process a content by at least one content processing device using the portable information terminal via the information providing apparatus and the device control apparatus. In the content processing system, content information containing unit identification information for identifying unit information of a content to be processed is stored in the information providing apparatus, and management information for identifying a specific content managed with respect to each user of the portable information terminal is stored in the information providing apparatus. The device control apparatus includes a device information storage portion to store device information for specifying content processing executable by the content processing device; a device information transmitting/receiving portion to transmit and receive the device information to and from a designated device designated as the content processing device to perform content processing by the portable information terminal and the information providing apparatus; a content selection information receiving portion to transmit and receive content selection information for identifying a selected content selected by the portable information terminal based on a content list including the content corresponding to the content information of a content processable by the designated device and extracted based on the device information of the designated device and the content corresponding to the content information of a specific content managed with respect to each portable information terminal and processable by the designated device and extracted based on the device information and the management information to and from the information providing apparatus and the designated device; and a processing request transmitting/receiving portion to transmit and receive a processing request indicating content processing to be performed on the selected content to and from the information providing apparatus and the designated device.

In this configuration, the content is selected by a user through the portable information terminal based on the content list including the content processable by the designated device, among the contents to be processed including a specific content managed with respect to each user. Then, the processing request for the selected content is received by the designated device via the information providing apparatus and the device control apparatus, and content processing is performed. A user can thereby use the content with the content processing device by selecting the content without depending on the content and the content processing device.

According to a fifth embodiment of the present invention, there is provided a content processing system made up of the information providing apparatus according to the first embodiment, the portable information terminal according to the second embodiment, the content processing device according to the third embodiment, and the device control apparatus according to the fourth embodiment.

According to a sixth embodiment of the present invention, there is provided a program for causing the information providing apparatus according to the first embodiment to execute an information providing method.

According to the embodiments of the present invention, it is possible to provide an information providing apparatus, a portable information terminal, a content processing device, a device control apparatus, a content processing system and a program that enable improvement in convenience for content selection and processing.

BRIEF DESCRIPTION OF THE DRAWINGS

FIG. 7A is an explanatory view showing an example of content information as ECG data.

FIG. 7B is an explanatory view showing an example of unit information as ECG data.

DETAILED DESCRIPTION OF THE PREFERRED EMBODIMENTS

Figure 1:
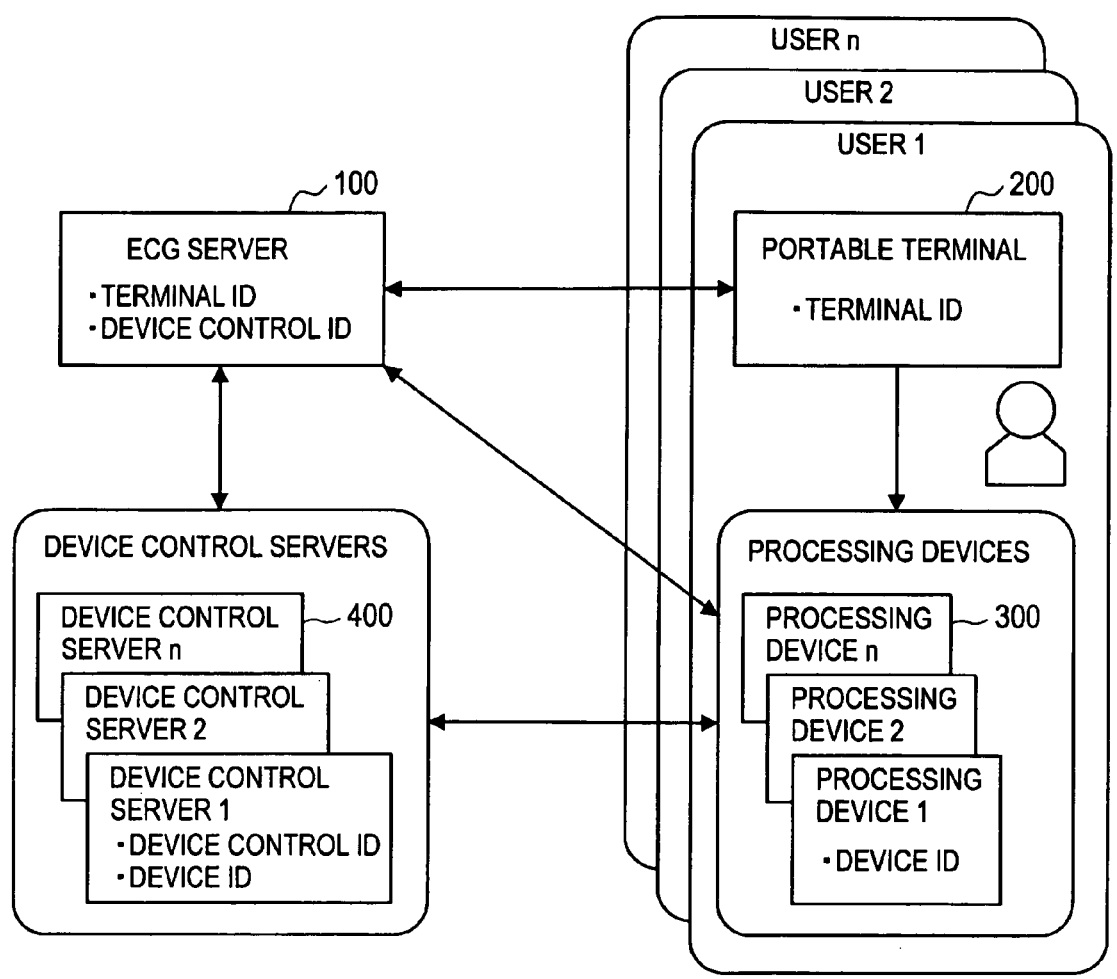
FIG. 1 is an explanatory view conceptually showing a content processing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

Concept of the Content Processing System

FIG. 1 is an explanatory view conceptually showing a content processing system according to an embodiment of the present invention. As shown in FIG. 1, the content processing system includes an electronic content guide (ECG) server 100 (information providing apparatus), a portable terminal 200 (portable information terminal), a processing device 300 (content processing device), and a device control server 400 (device control apparatus).

The portable terminal 200 transmits and receives information to and from the ECG server 100 through a communication network and transmits information to the processing device 300 using near field communication such as infrared communication, for example. The ECG server 100, the processing device 300 and the device control server 400 exchange information with one another through a communication network.

The portable terminal 200 is an example of portable information terminals including a cellular phone, a personal digital assistant (PDA) and so on, for example, and acquires content information, unit information and so on from the ECG server 100 and processes them. The processing device 300 is a television terminal, a PVR, various recording and reproducing apparatus, a personal computer and so on, for example, and it processes contents provided by a content provider 500, contents managed by a user, unit information acquired from the ECG server 100 and so on. The portable terminal 200 indirectly controls the processing device 300 by registering the processing device 300 in the content processing system and then transmitting a processing request to the ECG server 100.

The ECG server 100 registers and manages content information, unit information and so on and provides those information to the portable terminal 200 and the processing device 300. The device control server 400 allows the portable terminal 200 to indirectly control the processing device 300 in cooperation with the ECG server 100 to thereby allow the processing device 300 to perform content processing with use of the portable terminal 200.

The content is information such as video information, image information, text information and audio information, for example. The content is provided to a user by the content provider 500 using various kinds of service models such as a broadcast service, a communication service, a broadcast communication service and an internet service, various kinds of recording media such as a DVD, a CD and a magnetic tape and so on. The content is a target of content processing to be performed by the processing devices 300, such as viewing, recording, reproduction, viewing reservation and recording reservation, for example, when used by a user.

The content information is information associated with the content, and it involves identification information (a content ID, a title etc.), attribute information (e.g. a service model, a type of a recording medium, a classification of content, a keyword etc.), detailed information and so on of the content, for example. The content information corresponding to the time-scheduled content provided by a broadcast service or the like, for example, includes content scheduling information (a providing channel, broadcast date and time etc.).

The related information is information related to the content information, and it involves detailed information related to the attribute information of the content, sales information, advertising information, other content information and so on, for example. The unit information is information associated with the content, and it includes the content information and, selectively, the related information and it also includes information for associating the content information and the related information to the content.

A content ID that allows identification of the content is assigned to the content, and a unit ID that allows identification of the unit information is assigned to the unit information. The content information contains the unit ID for referring to the unit information of the corresponding content.

The portable terminal 200 registers at least one processing device 300 in the content processing system. The portable terminal 200 has a terminal ID that allows identification of the portable terminal 200. The portable terminal 200 is provided with a device control ID to be used for indirect control of the processing device 300 from a specific ECG server 100, and the ECG server 100 stores the device control ID in association with the terminal ID of the portable terminal 200. A device ID to be used by the portable terminal 200 for indirect control of the processing device 300 is assigned to the processing device 300 from a specific device control server 400, and the device control server 400 stores the device ID of the processing device 300 in association with the device control ID, thereby registering the processing device 300 in the content processing system.

Configuration of the Content Processing System

Figure 2:
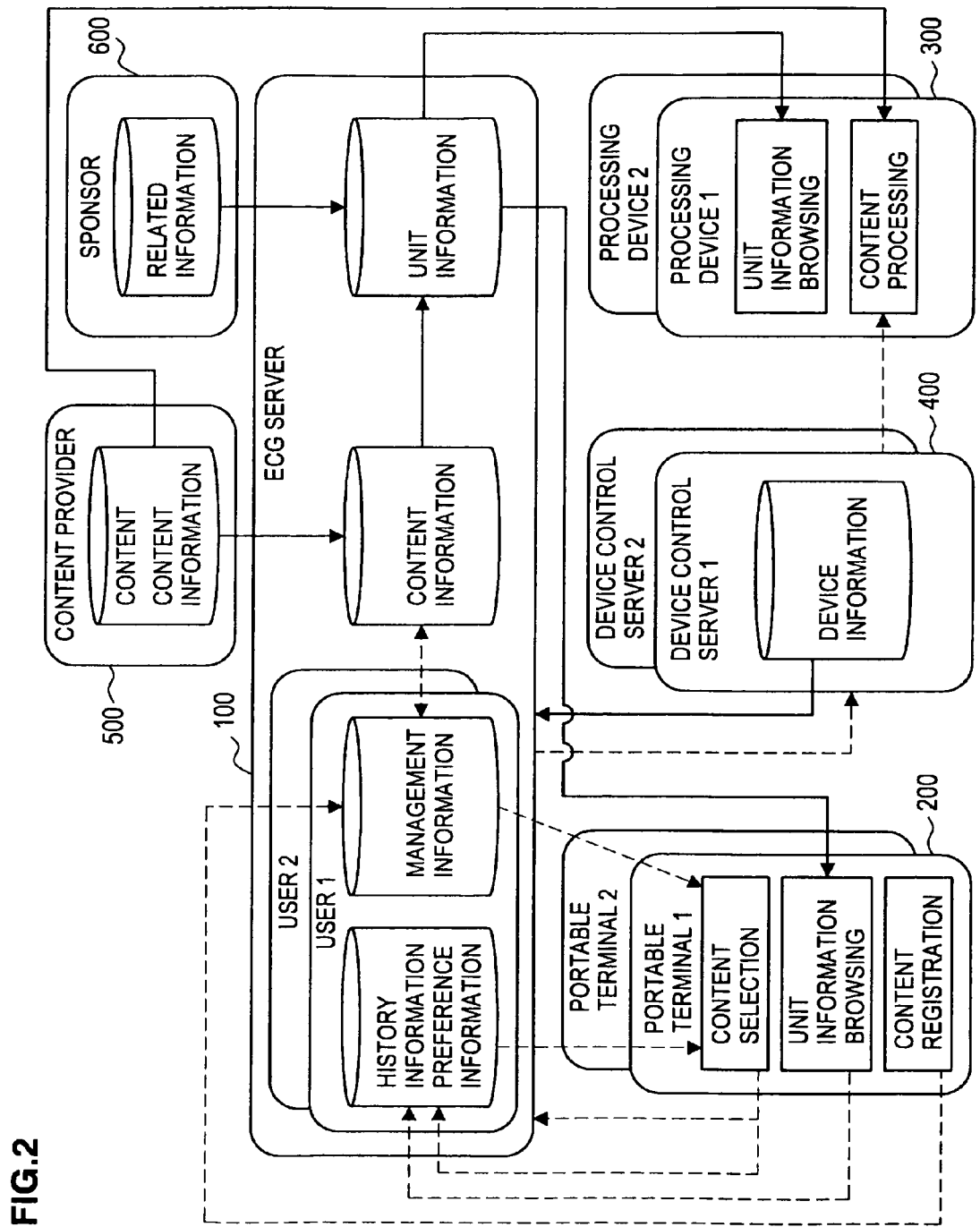
FIG. 2 is an explanatory view showing the configuration of a content processing system.

FIG. 2 is an explanatory view showing the configuration of a content processing system. In FIG. 2, transmission and reception of the content, the content information, the unit information and so on among the components of the content processing system are indicated by the solid arrows, and transmission and reception of the other information such as processing information and control information are indicated by the dotted arrows.

The processing device 300 acquires and processes the contents provided using various kinds of service models and/or processes the contents provided using various kinds of recording media. The processing device 300 is at least one processing device 300, and it is registered in the content processing system with respect to each user (each portable terminal 200) and indirectly controlled by a user through the portable terminal 200.

The ECG server 100 is operated and managed by a service provider or the like which provides the content information, the unit information and so on. The ECG server 100 registers and manages the content information provided by the content provider 500 and the related information provided by a sponsor 600 such as a sales agency, an advertising agency and the content provider 500 as ECG data. The ECG server 100 provides the content information and the unit information containing the content information and, selectively, the related information to the portable terminal 200 and the processing device 300.

The ECG server 100 manages the content information of general contents which are provided using various kinds of service models and various kinds of recording media. The general contents are time-scheduled contents provided by a broadcast service, for example, non-time-scheduled contents provided by a communication service, for example, or provided by a recording medium and so on. The time-scheduled contents include contents that have been provided in the past, contents that are currently being provided and contents that will be provided in the future.

Further, the ECG server 100 manages management information for managing specific contents with respect to each user (each portable terminal 200). The specific contents are contents selected by a user as a target of processing, contents recorded in recording media and registered by a user and so on, for example. The management information contains a content ID that allows identification of the content and information that allows identification of the processing device 300 capable of processing the content. Furthermore, the ECG server 100 manages history information for managing the content and the unit information selected by a user as a target of processing with respect to each user (each portable terminal 200) and also manages preference information generated for each user based on the history information. The history information is information containing the content ID and information (designated device ID) that allows identification of the processing device 300 which has processed the content, or the unit ID.

The device control server 400 is operated and managed by a manufacturer of the processing device 300 which is indirectly controlled by the portable terminal 200, a service provider that provides a content processing service or the like, for example. The device control server 400 is the device control server 400 that provides a content processing service using the processing device 300 manufactured by a manufacturer A, the device control server 400 that provides a content processing service using the processing device 300 manufactured by a manufacturer B, the device control server 400 that provides a content processing service using the processing device 300 manufactured by various manufacturers and so on, for example.

In the above content processing system, a desired processing device 300 is designated among the processing devices 300 registered in the content processing system by a user through the portable terminal 200. If the processing device 300 is designated, based on the device information of the designated processing device 300 (designated device 300) that is managed by the device control server 400, the ECG server 100 extracts the content which can be processed by the designated device 300 from the contents corresponding to the content information and the management information for each user, which are managed within the ECG server 100. The ECG server 100 then creates a content list including the extracted content based on the preference information of a user and transmits it to the portable terminal 200, and the portable terminal 200 displays the content list as a selection menu.

The portable terminal 200 transmits a processing request on the content (selected content) selected by a user based on the selection menu to the ECG server 100. The ECG server 100 transmits the processing request on the selected content to the designated device 300, and the designated device 300 performs processing on the selected content, such as viewing, recording, reproduction, viewing reservation and recording reservation, for example, in response to the processing request. Then, the ECG server 100 manages the selection history information of contents with respect to each user and manages the preference information of each user based on the history information.

The ECG server 100 provides the unit information of the content to the portable terminal 200 and, selectively, to the processing device 300 together with or separately from the processing on the selected content, and the portable terminal 200 and the processing device 300 display or reproduce the unit information, thereby letting a user browse the content information and the related information. Then, the ECG server 100 manages the selection history information of unit information with respect to each user and manages the preference information of each user based on the history information.

FIGS. 3 to 6 are block diagrams showing the primary functional configurations of the ECG server 100, the portable terminal 200, the processing device 300 and the device control server 400, which constitute the content processing system.

Configuration of the ECG Server 100

Figure 3:
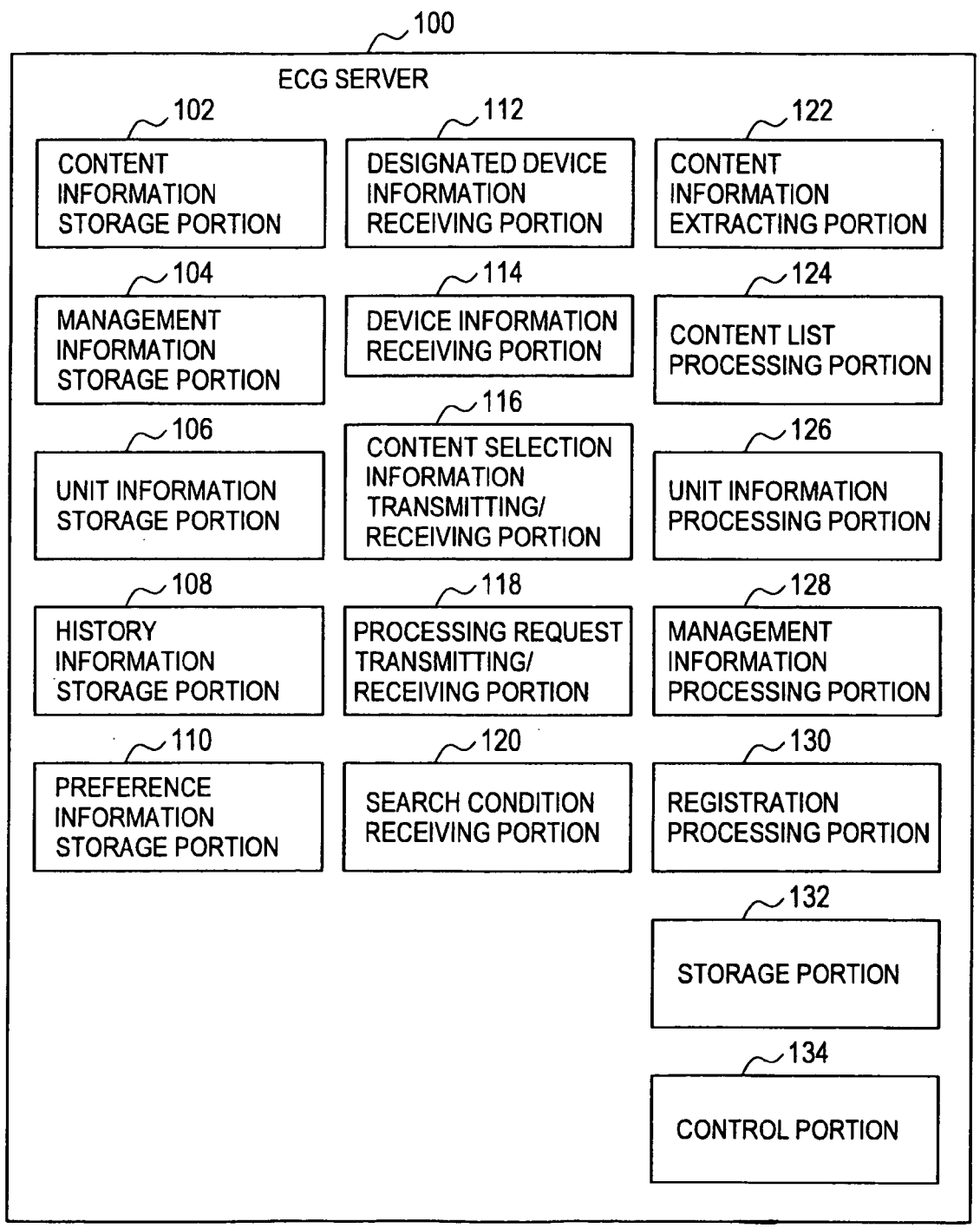
FIG. 3 is a block diagram showing the primary functional components of an ECG server.

FIG. 3 is a block diagram showing the primary functional components of the ECG server 100. As shown in FIG. 3, the ECG server 100 includes a content information storage portion 102, a management information storage portion 104, a unit information storage portion 106, a history information storage portion 108, a preference information storage portion 110, a designated device information receiving portion 112, a device information receiving portion 114, a content selection information transmitting/receiving portion 116, a processing request transmitting/receiving portion 118, a search condition receiving portion 120, a content information extracting portion 122, a content list processing portion 124, a unit information processing portion 126, a management information processing portion 128, a registration processing portion 130, a storage portion 132 and a control portion 134. FIG. 3 shows the primary functional components which are particularly related to the content processing system, of the functional components of the ECG server 100.

The content information storage portion 102 stores the content information containing a unit ID that allows identification of the unit information of the content to be processed. The management information storage portion 104 stores the management information that allows identification of the specific content managed with respect to each user of the portable terminal 200. The unit information storage portion 106 stores the unit information containing the content information and, selectively, the related information related to the content information in association with the content. The history information storage portion 108 stores a selected content ID that allows identification of the selected content as the history information with respect to each portable terminal 200. The preference information storage portion 110 stores the preference information generated based on the history information with respect to each portable terminal 200.

The designated device information receiving portion 112 receives a designated device ID that allows identification of the processing device 300 to perform content processing from the portable terminal 200. The device information receiving portion 114 receives the device information that can specify the content processing executable by the designated device 300 from the device control server 400. The content selection information transmitting/receiving portion 116 receives the selected content ID that allows identification of the selected content selected based on the content list from the portable terminal 200 and transmits it to the designated device 300 via the device control server 400. The processing request transmitting/receiving portion 118 receives a processing request indicating the content processing to be performed on the selected content from the portable terminal 200 and transmits it to the designated device 300 via the device control server 400. The search condition receiving portion 120 receives a search condition of a registration content to be registered as the specific content to be managed with respect to each user of the portable terminal 200 from the portable terminal 200.

The content information extracting portion 122 is a functional portion that extracts the content information of the content which can be processed by the designated device 300 based on the device information from the content information storage portion 102 and extracts the content information of the content, among the specific contents managed with respect to each user of the portable terminal 200, which can be processed by the designated device 300 based on the device information and the management information from the content information storage portion 102. The content list processing portion 124 is a functional portion that creates a content list containing the contents corresponding to the extracted content information and transmits it to the portable terminal 200.

The unit information processing portion 126 is a functional portion that extracts the unit information of the selected content from the unit information storage portion 106 based on the unit ID contained in the content information of the selected content and provides it to the portable terminal 200. The management information processing portion 128 is a functional portion that stores the management information which allows identification of the selected content into the management information storage portion 104. The registration processing portion 130 is a functional portion that performs various kinds of processing for the registration processing of the designated device 300.

The storage portion 132 stores various data necessary for various kinds of processing by the ECG server 100, programs for operating the ECG server 100 and so on. The control portion 134 is a functional portion that controls the other functional components to thereby control the overall function of the ECG server 100.

In the above configuration, the content information storage portion 102, the management information storage portion 104, the unit information storage portion 106, the history information storage portion 108, the preference information storage portion 110 and the storage portion 132 are configured as storage units such as memory and hard disk. The designated device information receiving portion 112, the device information receiving portion 114, the content selection information transmitting/receiving portion 116, the processing request transmitting/receiving portion 118, the search condition receiving portion 120, a part of the function of the content list processing portion 124, a part of the function of the unit information processing portion 126 are configured as communication devices or the like that transmit and receive information to and from the portable terminal 200, the processing device 300 and the device control server 400. The content information extracting portion 122, a part of the function of the content list processing portion 124, a part of the unit information processing portion 126, the management information processing portion 128, the registration processing portion 130 and the control portion 134 are configured as processing control processors that perform various kinds of processing control, programs to be executed on the processing control processors or the like.

Configuration of the Portable Terminal 200

Figure 4:
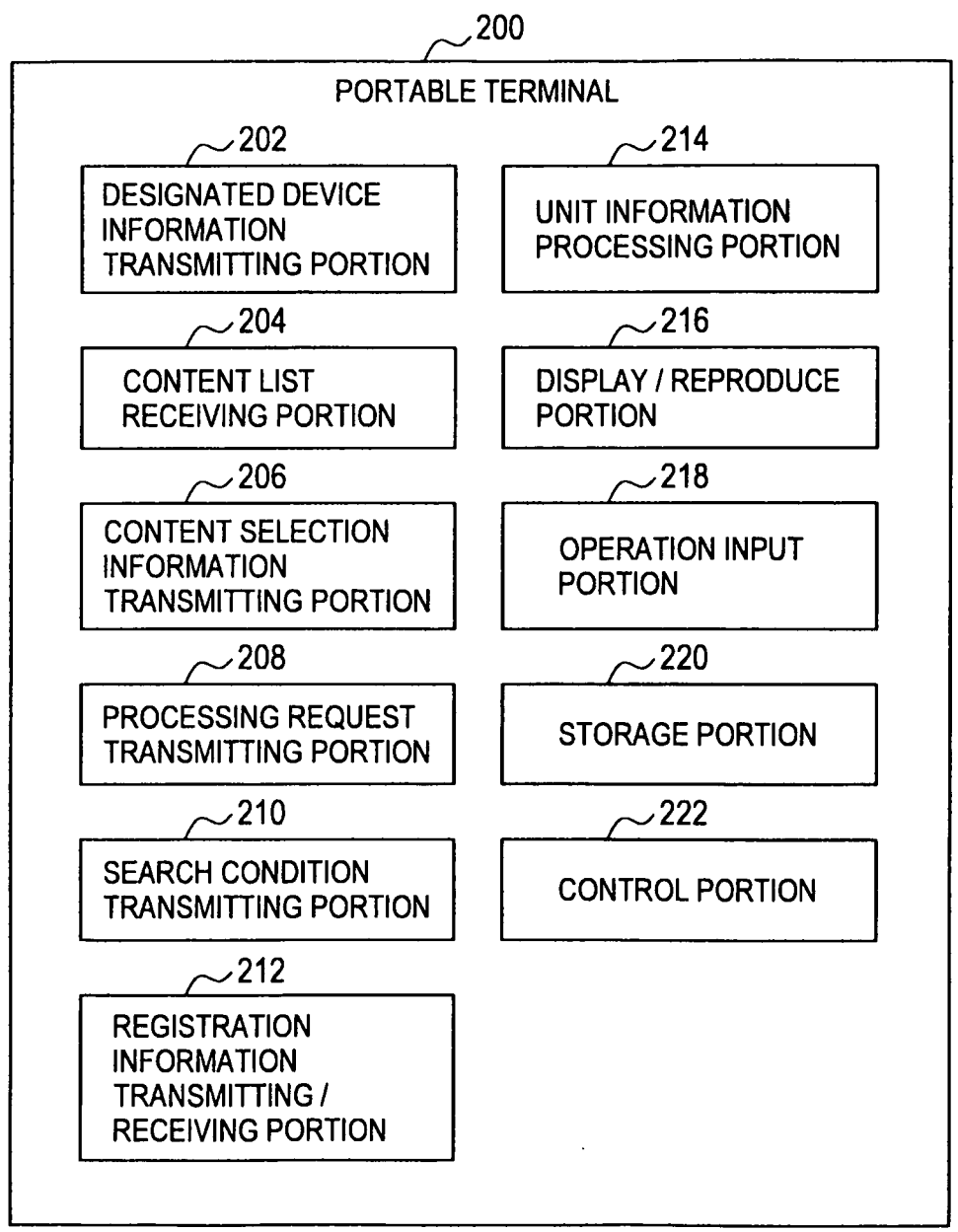
FIG. 4 is a block diagram showing the primary functional components of a portable terminal.

FIG. 4 is a block diagram showing the primary functional components of the portable terminal 200. As shown in FIG. 4, the portable terminal 200 includes a designated device information transmitting portion 202, a content list receiving portion 204, a content selection information transmitting portion 206, a processing request transmitting portion 208, a search condition transmitting portion 210, a registration information transmitting/receiving portion 212, a unit information processing portion 214, a display/reproducing portion 216, an operation input portion 218, a storage portion 220 and a control portion 222. FIG. 4 shows the primary functional components which are particularly related to the content processing system, of the functional components of the portable terminal 200.

The designated device information transmitting portion 202 transmits the designated device ID to the ECG server 100. The content list receiving portion 204 receives the content list from the ECG server 100. The content selection information transmitting portion 206 transmits the selected content ID to the designated device 300 via the ECG server 100 and the device control server 400. The processing request transmitting portion 208 transmits the processing request to the designated device 300 via the ECG server 100 and the device control server 400. The search condition transmitting portion 210 transmits the search condition of the registration content to the ECG server 100. The registration information transmitting/receiving portion 212 transmits and receives registration information used for registration processing of the processing device 300 to and from the ECG server 100 and the processing device 300.

The unit information processing portion 214 is a functional portion that acquires the unit information extracted as the unit information of the selected content based on the unit ID contained in the content information of the selected content from the ECG server 100 and processes the acquired unit information. The display/reproducing portion 216 displays or reproduces the content list and the unit information.

The operation input portion 218 allows a user to input various kinds of operation information. The storage portion 220 stores various data necessary for various kinds of processing by the portable terminal 200, programs for operating the portable terminal 200 according to need and so on. The control portion 222 is a functional portion that controls the other functional components to thereby control the overall function of the portable terminal 200.

In the above configuration, the designated device information transmitting portion 202, the content list receiving portion 204, the content selection information transmitting portion 206, the processing request transmitting portion 208, the search condition transmitting portion 210, the registration information transmitting/receiving portion 212 and a part of the function of the unit information processing portion 214 are configured as communication devices or the like that transmit and receive information to and from the ECG server 100 and the processing device 300. The display/reproducing portion 216 is configured as a liquid crystal panel or the like. The operation input portion 218 is configured as various kinds of operating devices such as keys and buttons. The storage portion 220 is configured as a storage unit such as memory and hard disk. A part of the function of the unit information processing portion 214 and the control portion 222 are configured as processing control processors that perform various kinds of processing control, programs to be executed on the processing control processors or the like.

Configuration of the Processing Device 300

Figure 5:
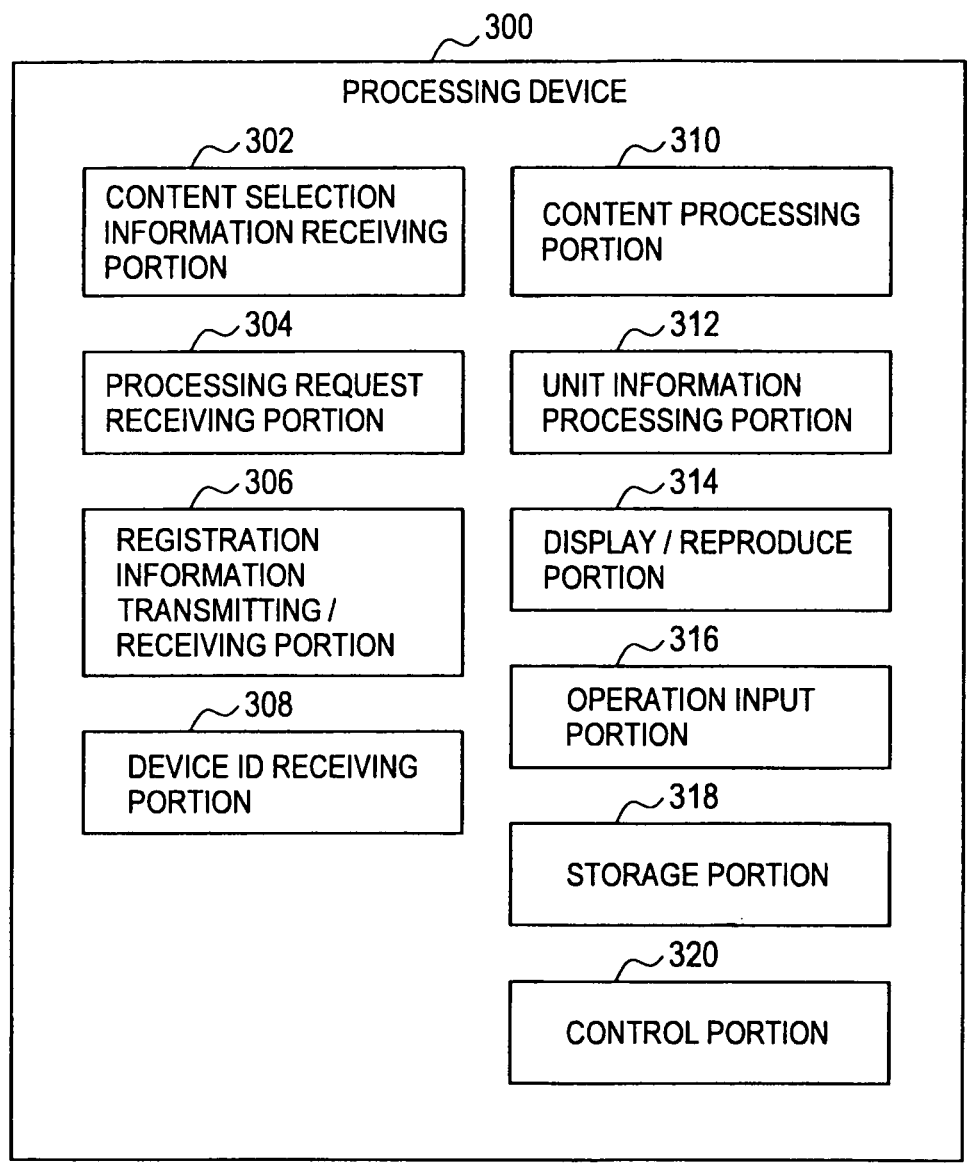
FIG. 5 is a block diagram showing the primary functional components of a processing device.

FIG. 5 is a block diagram showing the primary functional components of the processing device 300. As shown in FIG. 5, the processing device 300 includes a content selection information receiving portion 302, a processing request receiving portion 304, a registration information transmitting/receiving portion 306, a device ID receiving portion 308, a content processing portion 310, a unit information processing portion 312, a display/reproducing portion 314, an operation input portion 316, a storage portion 318 and a control portion 320. FIG. 5 shows the primary functional components which are particularly related to the content processing system, of the functional components of the processing device 300.

The content selection information receiving portion 302 receives the selected content ID from the portable terminal 200 via the ECG server 100 and the device control server 400. The processing request receiving portion 304 receives the processing request from the portable terminal 200 via the ECG server 100 and the device control server 400. The registration information transmitting/receiving portion 306 transmits and receives the registration information used for registration processing of the processing device 300 to and from the portable terminal 200 and the ECG server 100. The device ID receiving portion 308 receives the device ID used for the portable terminal 200 to indirectly control the processing device 300 from the device control server 400.

The content processing portion 310 performs processing on the selected content, such as viewing, recording, reproduction, viewing reservation and recording reservation, based on the received selected content ID and the received processing request. The unit information processing portion 312 acquires the unit information extracted as the unit information of the selected content based on the unit ID contained in the content information of the selected content from the ECG server 100 and processes the acquired unit information.

The display/reproducing portion 314 displays or reproduces the content and the unit information. The operation input portion 316 allows a user to input various kinds of operation information. The storage portion 318 stores various data necessary for various kinds of processing by the processing device 300, programs for operating the processing device 300 according to need and so on. The control portion 320 is a functional portion that controls the other functional components to thereby control the overall function of the processing device 300.

In the above configuration, the content selection information receiving portion 302, the processing request receiving portion 304, the registration information transmitting/receiving portion 306, the device ID receiving portion 308 and a part of the function of the unit information processing portion 312 are configured as communication devices or the like that transmit and receive information to and from the ECG server 100 and the device control server 400. The display/reproducing portion 314 is configured as a display, a liquid crystal panel or the like. The operation input portion 316 is configured as various kinds of operating devices such as keys and buttons mounted on the processing device 300, a remote controller included with the processing device 300 or the like. The storage portion 318 is configured as memory or the like. The content processing portion 310, a part of the function of the unit information processing portion 312 and the control portion 320 are configured as processing control processors that perform various kinds of processing control, programs to be executed on the processing control processors or the like.

Configuration of the Device Control Server 400

Figure 6:
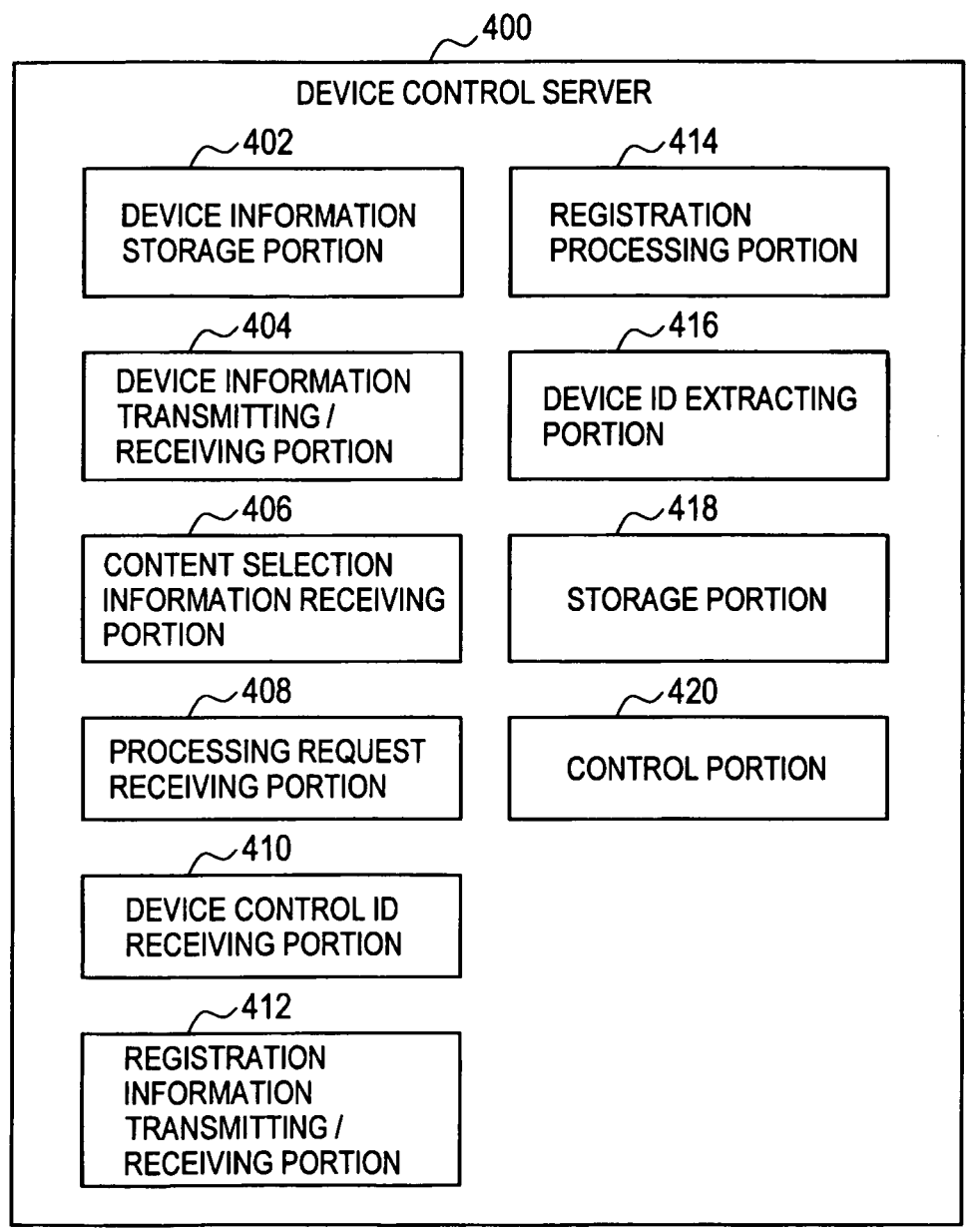
FIG. 6 is a block diagram showing the primary functional components of a device control server.

FIG. 6 is a block diagram showing the primary functional components of the device control server 400. As shown in FIG. 6, the device control server 400 includes a device information storage portion 402, a device information transmitting/receiving portion 404, a content selection information receiving portion 406, a processing request receiving portion 408, a device control ID receiving portion 410, a registration information transmitting/receiving portion 412, a registration processing portion 414, a device ID extracting portion 416, a storage portion 418 and a control portion 420. FIG. 6 shows the primary functional components which are particularly related to the content processing system, of the functional components of the device control server 400.

The device information storage portion 402 stores the device information of the processing device 300. The device information transmitting/receiving portion 404 transmits and receives the device information to and from the ECG server 100 and the processing device 300. The content selection information receiving portion 406 transmits and receives the content selection information to and from the ECG server 100 and the processing device 300. The processing request receiving portion 408 transmits and receives the processing request to and from the ECG server 100 and the processing device 300. The device control ID receiving portion 410 receives the device control ID used for the portable terminal 200 to indirectly control the processing device 300 from the ECG server 100. The registration information transmitting/receiving portion 412 transmits and receives the registration information used for registration processing of the processing device 300 to and from the ECG server 100 and the processing device 300.

The registration processing portion 414 is a functional portion that performs various kinds of processing for registration processing of the processing device 300. The device ID extracting portion 416 is a functional portion that extracts the device ID stored in association with the device control ID. The storage portion 418 is a functional portion that stores various data necessary for various kinds of processing by the device control server 400, programs for operating the device control server 400 and so on. The control portion 420 is a functional portion that controls the other functional components to thereby control the overall function of the device control server 400.

In the above configuration, the device information transmitting/receiving portion 404, the content selection information receiving portion 406, the processing request receiving portion 408, the device control ID receiving portion 410 and the registration information transmitting/receiving portion 412 are configured as communication devices or the like that transmit and receive various information to and from the ECG server 100 and the processing device 300. The device information storage portion 402 and the storage portion 418 are configured as storage units such as memory and hard disk. The registration processing portion 414, the device ID extracting portion 416 and the control portion 420 are configured as processing control processors that perform various kinds of processing control, programs to be executed on the processing control processors or the like.

Structure of Content Information and Unit Information

FIGS. 7A and 7B are explanatory views showing examples of content information and unit information, respectively, as ECG data.

The content information shown in FIG. 7A contains the content ID "c9999", the title "professional style", the genre "documentary", the synopsis "introducing professionals of . . . ", the provision start date and time "2007/7/1 22:00:00", the end time "23:00:00", and the keywords "AAA work impression". Further, the content information contains the credits list made up of cast names and identification information as detailed information of the content. The content information further contains the unit ID "u5555" for referring to the unit information corresponding to the content.

The unit information shown in FIG. 7B contains the unit ID "u5555" of the unit information, the content information and the related information related to the content information.

As the content information, detailed information of two casts, i.e. the cast names, the priorities, the information types, the presentation types and the references for detailed information (image URL, text), are contained. The priority and the presentation type of the detailed information indicate the display priority and the presentation type at the time of unit information browsing processing, which is described later, and the reference for detailed information indicates the location of reference data (image, text etc.).

As the related information, sales information of a product related to the content, i.e. the product name " . . . DVD package", the priority, the information type, the presentation type and the reference for detailed information (image related to the product, text, QR code), are contained.

The content information is provided by the content provider 500 and registered and managed as ECG data in the ECG server 100. The unit information, which is information containing the content information provided by the content provider 500 and selectively containing the related information provided by the sponsor 600, is associated with the content and managed as ECG data in the ECG server 100. The content provider 500 and the sponsor 600 provide the ECG server 100 with update information of the content information and the related information, and the ECG server 100 updates the content information and the unit information managed thereby based on the update information.

The unit information is provided from the ECG server 100 to the portable terminal 200 and the processing device 300 having unit information browsing processing function, processed by the portable terminal 200 and the processing device 300 and browsed by a user. In the unit information browsing processing, the content information and the related information contained in the unit information are displayed or reproduced based on the prescribed display priority, presentation type and so on, and various kinds of processing such as display of detailed information, purchase processing and payment processing are executed according to manipulation by a user.

Various processing in the content processing system are described hereinafter with reference to FIGS. 8 to 16.

Device Registration Processing

Figure 8:
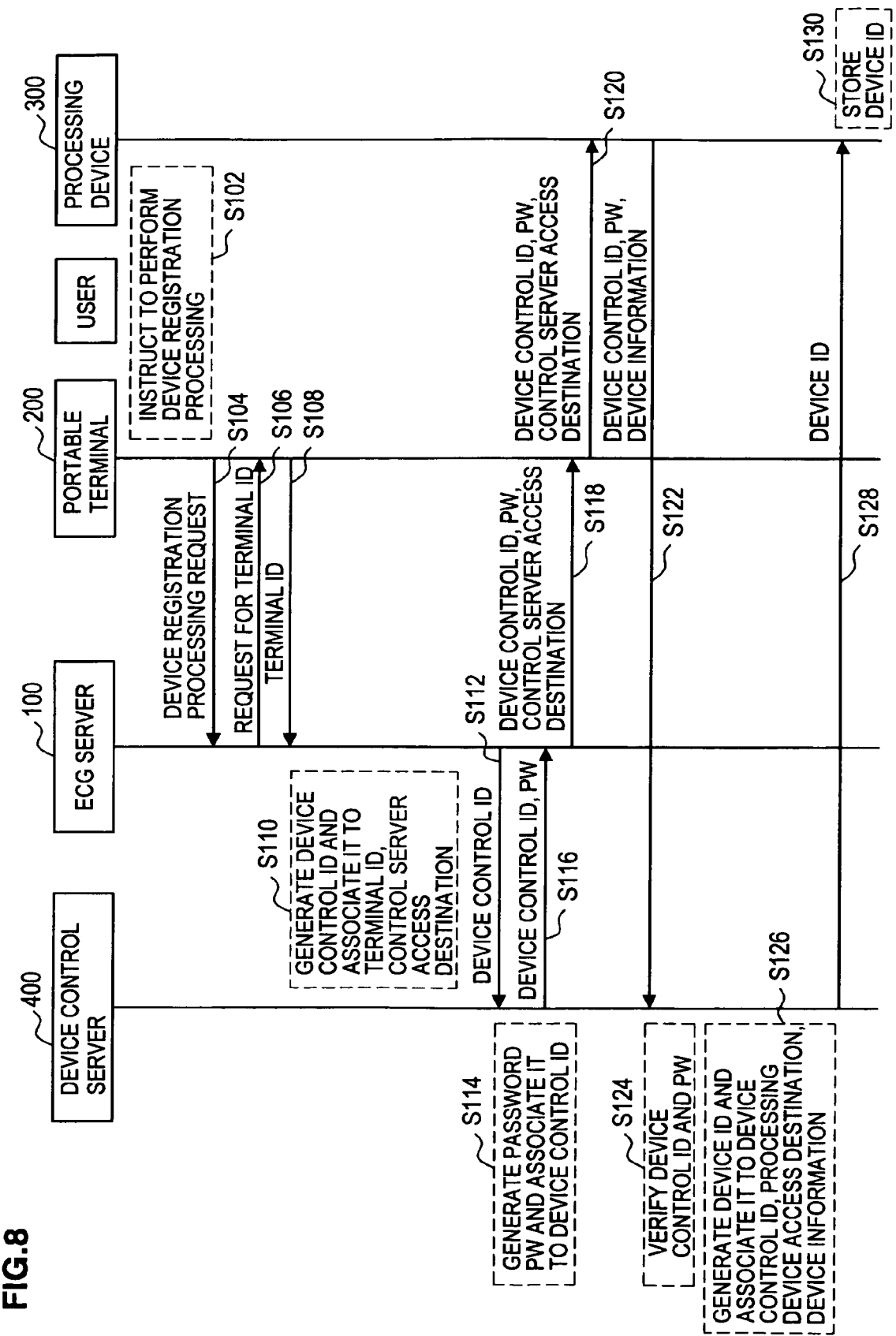
FIG. 8 is a sequence chart showing the procedure of device registration processing.

FIG. 8 is a sequence chart showing the procedure of device registration processing. The device registration processing is processing for registering the processing device 300 in the content processing system.

When the portable terminal 200 receives an instruction for device registration processing from a user (Step S102), the portable terminal 200 transmits a processing request for device registration processing to the ECG server 100 (S104). Receiving the processing request, the ECG server 100 requests the portable terminal 200 to transmit a terminal ID that allows identification of the portable terminal 200, such as an access destination on a communication network and a product number (S106), and the portable terminal 200 transmits its terminal ID to the ECG server 100 (S108). Receiving the terminal ID, the ECG server 100 generates a device control ID and stores the device control ID in association with the access destination of a specific device control server 400 and the terminal ID (S110). The specific device control server 400 is the device control server 400 that registers the processing device 300 to be controlled indirectly by the portable terminal 200, and it may be specified by the ECG server 100 or specified in advance by a user of the portable terminal 200.

The ECG server 100 transmits the device control ID to the specific device control server 400 (S112). Receiving the device control ID, the device control server 400 generates a password to be used for registration of the processing device 300, stores the password in association with the device control ID (S114), and transmits the device control ID and the password to the ECG server 100 (S116). Receiving the device control ID and the password, the ECG server 100 transmits the device control ID, the password, and the access destination of the device control server 400 stored in association with the device control ID to the portable terminal 200 (S118). Receiving the device control ID, the password and the access destination of the device control server 400, the portable terminal 200 transmits the received information to the processing device 300 (S120).

Receiving the device control ID, the password and the access destination of the device control server 400, the processing device 300 accesses the device control server 400 to register the processing device 300 based on the access destination of the device control server 400 and transmits the device control ID, the password and the device information of the processing device 300 (S122). The device information of the processing device 300 is identification information (device name etc.) of the processing device 300 and information for specifying the processing function (e.g. viewing function, recording function, reproducing function, available service model and recording media etc.) of the processing device 300. Receiving the device control ID, the password and the device information, the device control server 400 verifies the received device control ID and the password against the stored device control ID and the password (S124). If the verification result is positive, the device control server 400 generates a device ID and stores the device ID in association with the device control ID, the access destination of the processing device 300 and the device information of the processing device 300 (S126), thereby registering the processing device 300 in the content processing system. Then, the device control server 400 transmits the device ID to the processing device 300 (S128), and the processing device 300 stores the device ID (S130).

It is feasible to associate the terminal ID of one portable terminal 200 with the device IDs of a plurality of processing devices 300, or associate the terminal IDs of a plurality of portable terminals 200 with the device ID of one processing devices 300, using the device control ID. A user may register the processing device 300 in a plurality of device control servers 400 using the portable terminal 200.

By the above procedure, the processing device 300 is registered in the content processing system by the portable terminal 200, thereby enabling indirect control of the processing device 300 by the portable terminal 200. Consequently, a user can make the processing device 300 perform various processing as described below, for example, with use of the portable terminal 200.

Content Registration Processing

Figure 9:
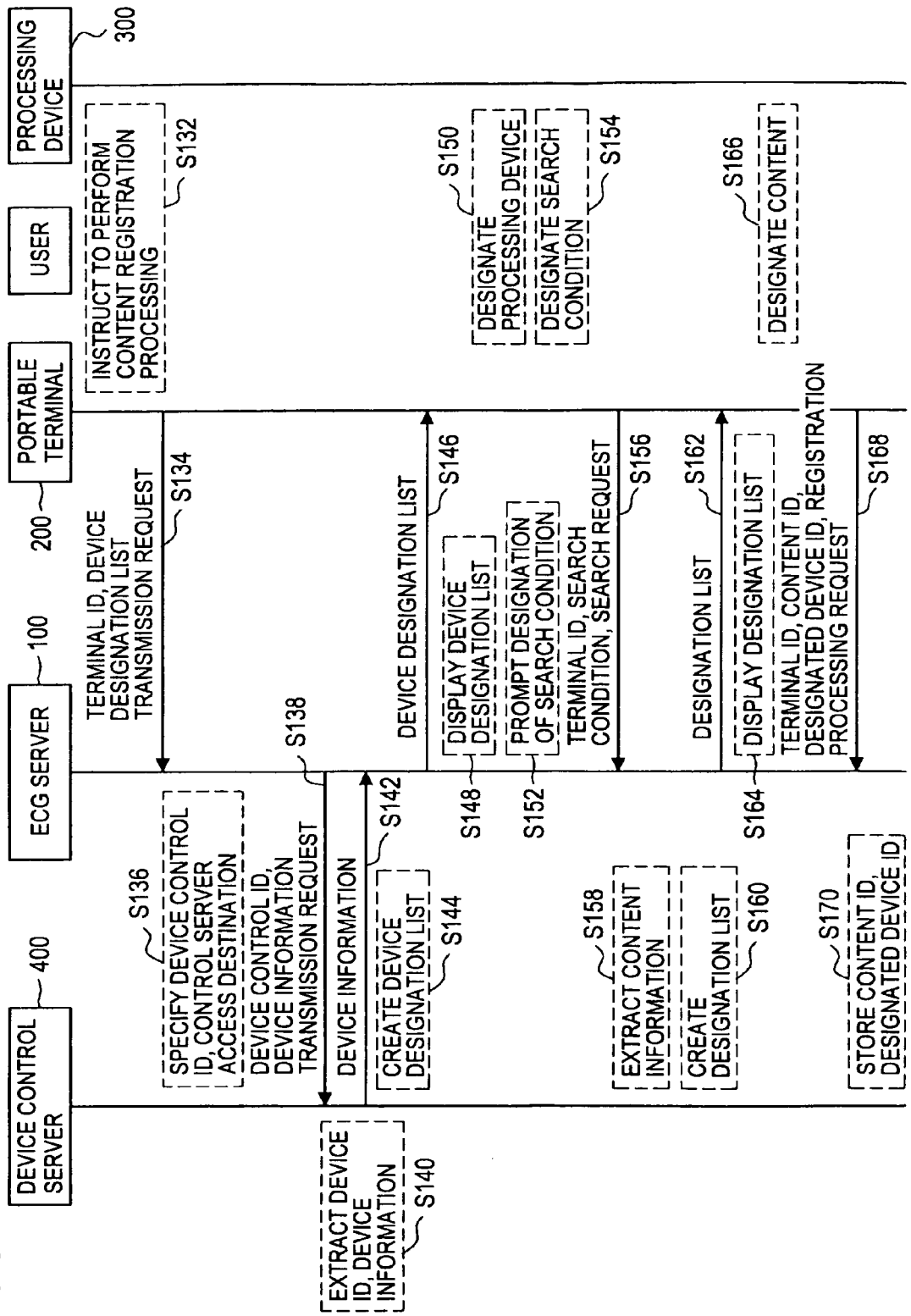
FIG. 9 is a sequence chart showing the procedure of content registration processing.
Figure 10A:
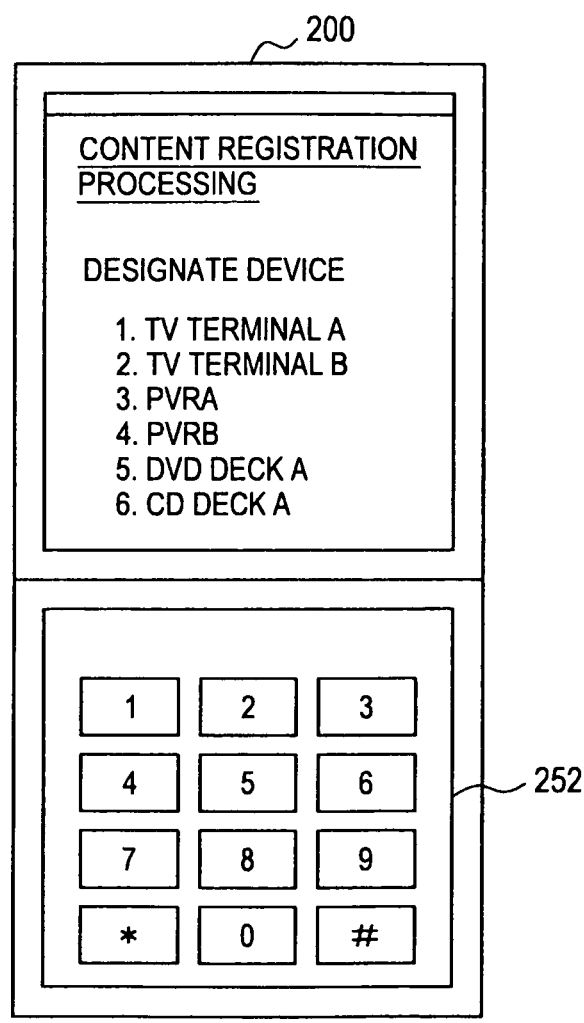
FIG. 10A is an explanatory view showing an example of an operation menu displayed on a portable terminal during content registration processing.
Figure 10B:
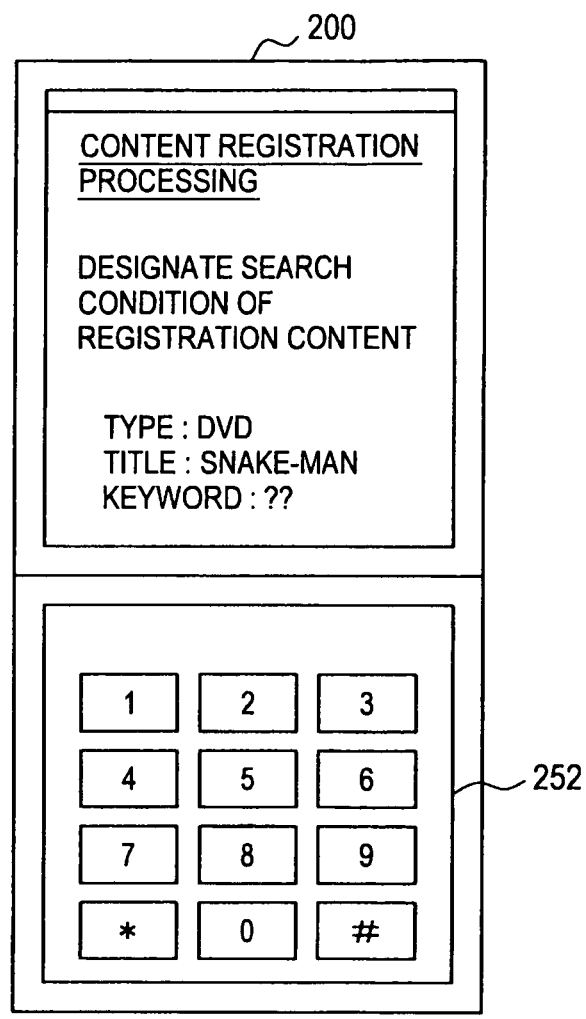
FIG. 10B is an explanatory view showing an example of an operation menu displayed on a portable terminal during content registration processing.
Figure 10C:
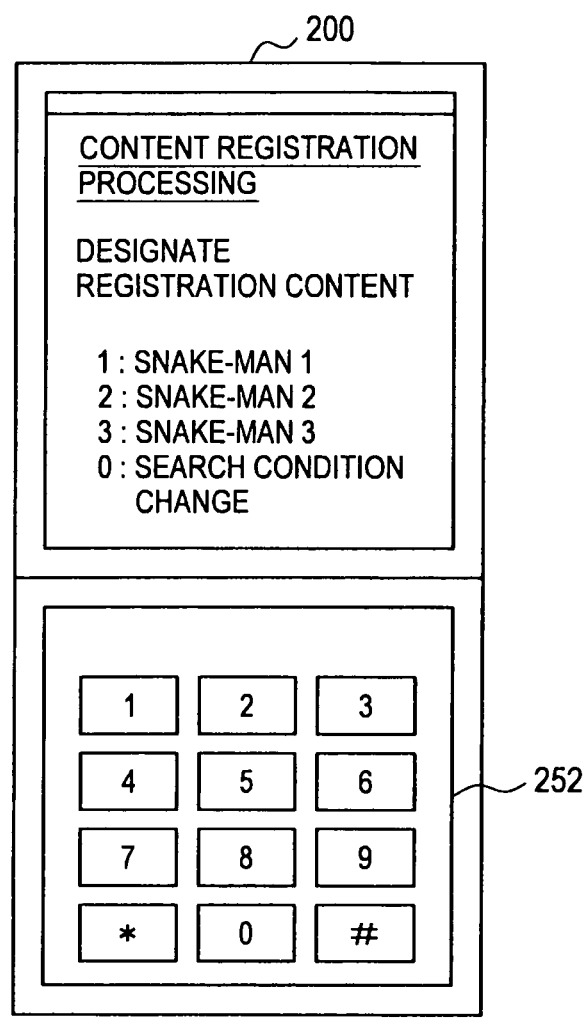
FIG. 10C is an explanatory view showing an example of an operation menu displayed on a portable terminal during content registration processing.

The procedure of content registration processing is described hereinafter with reference to FIG. 9 and FIGS. 10A to 10C. FIG. 9 is a sequence chart showing the procedure of content registration processing, and FIGS. 10A to 10C are explanatory views showing examples of the operation menu displayed on the portable terminal 200 during content registration processing. The content registration processing is processing for registering particular contents recorded in recording media and the processing device 300 managed by a user in the ECG server 100.

When the portable terminal 200 receives an instruction for content registration processing from a user (S132), the portable terminal 200 displays a device designation list that designates the processing devices 300 registered by the device registration processing as shown in FIG. 10A. The portable terminal 200 may acquire the device designation list from the ECG server 100 and display it or may store information necessary for creating the device designation list in advance and then read the information and create and display the device designation list. In the case of acquiring the device designation list from the ECG server 100, the portable terminal 200 transmits a transmission request for the device designation list and the terminal ID to the ECG server 100 (S134), and the ECG server 100 acquires the device information of the processing device 300 from the device control server 400 based on the device control ID or the like stored in association with the terminal ID and creates the device designation list (S136 to S144), and provides it to the portable terminal 200 (S146). If the device designation list is displayed on the portable terminal 200 (S148), a user designates the processing device 300 capable of processing the content to be registered (registration content) by manipulating keys 252 or the like (S150). The processing device 300 capable of processing the registration content may be designated as a plurality of processing devices 300. When creating the device designation list, the device control server 400 may access the processing device 300 and check the status of the processing device 300 to thereby create the device designation list that includes only the processing devices 300 which are confirmed to be in the executable status of the content processing (e.g. power is on etc.).

After the processing device 300 is designated, the portable terminal 200 prompts a user to designate search conditions to be used for content search, such as a type, a title, a keyword and, selectively, a service model of the registration content, as shown in FIG. 10B (S152). After the search conditions are designated (S154), the portable terminal 200 transmits a request for content search, the terminal ID and the search conditions to the ECG server 110 (S156). In the example shown in FIG. 10B, the registration content type "DVD" and the title "SNAKE-MAN" are designated as the search conditions. If the information allowing identification of the content, such as a product number, a product code and a QR code, is contained in the identification information or the attribute information of the content, such information may be designated as the search condition.

Receiving the search request, the ECG server 100 extracts the content information matching the search conditions from the content information managed thereby (S158), creates a designation list including the identification information (title etc.), the attribute information and so on contained in the content information (S160), and transmits it to the portable terminal 200 (S162). Receiving the designation list, the portable terminal 200 displays the designation list as shown in FIG. 10C (S164), and a user designates the registration content from the designation list (S166). In the example shown in FIG. 10C, the designation list including "SNAKE-MAN1", "SNAKE-MAN2" and "SNAKE-MAN3", which are the contents matching the search conditions, is displayed. If the content corresponding to the registration content is not included in the designation list, a user designates "change search condition" and then designates search conditions again.

After the registration content is designated, the portable terminal 200 transmits a processing request for content registration processing, the terminal ID, the content ID contained in the corresponding content information and a designated device ID allowing identification of the designated processing device 300 (designated device 300) to the ECG server 100 (S168). Receiving the processing request, the ECG server 100 stores the content ID and the designated device ID and, if needed, management information containing identification information in association with the terminal ID (S170).

A user can thereby register the content as the specific content to be managed with respect to each user. Then, a user can select a desired content from the general contents and the specific content and cause the content processing system to perform the content processing and the unit information browsing processing, as described in detail later.

Content Selection Processing

Figure 11:
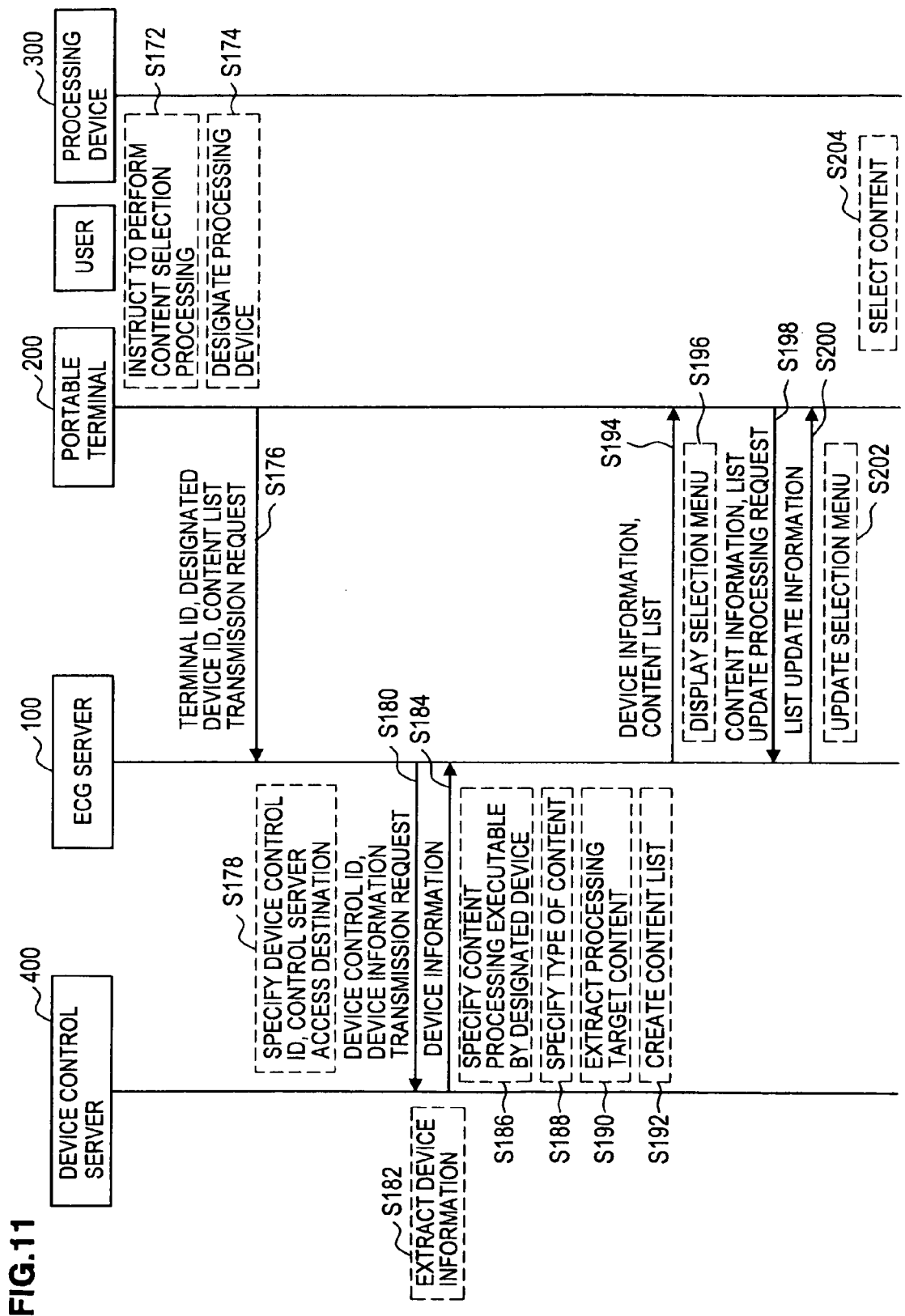
FIG. 11 is a sequence chart showing the procedure of content selection processing.
Figure 12A:
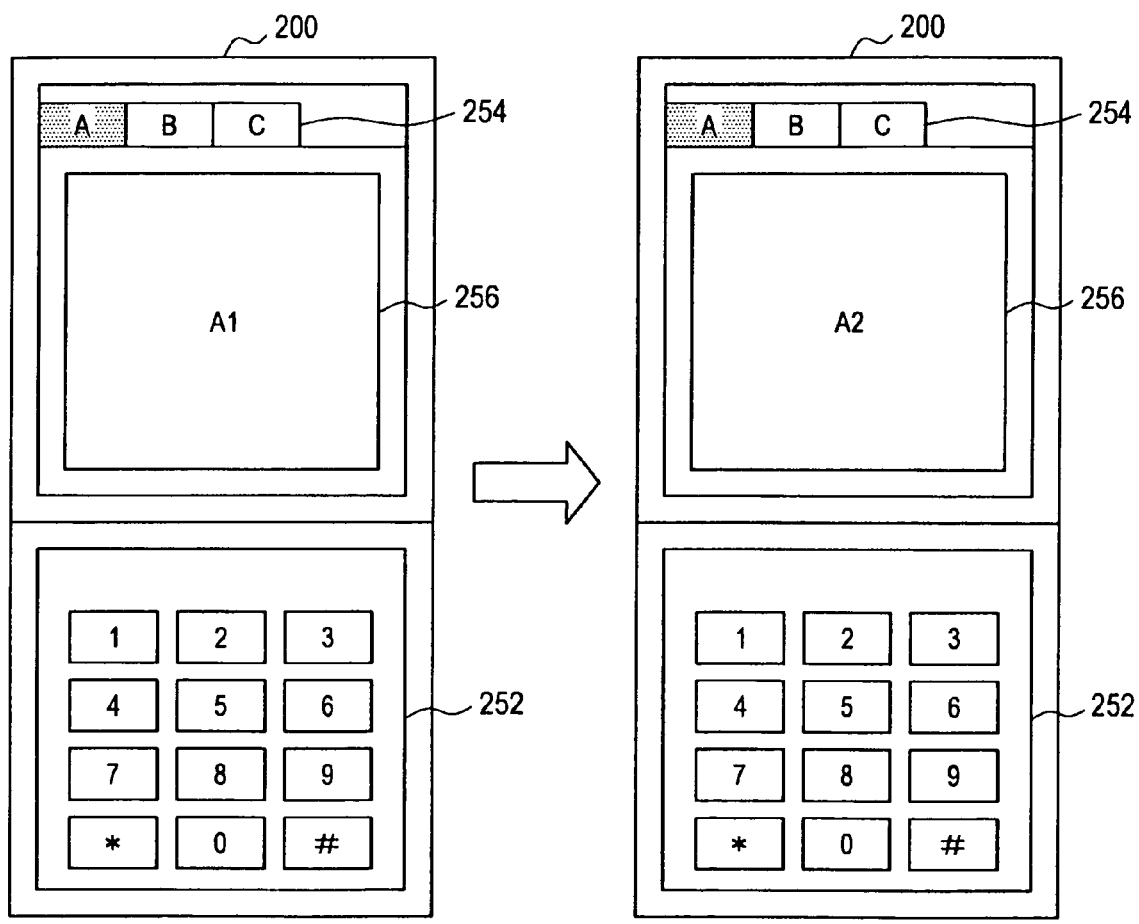
FIG. 12A is an explanatory view showing an example of an operation menu displayed on a portable terminal during content selection processing.
Figure 12B:
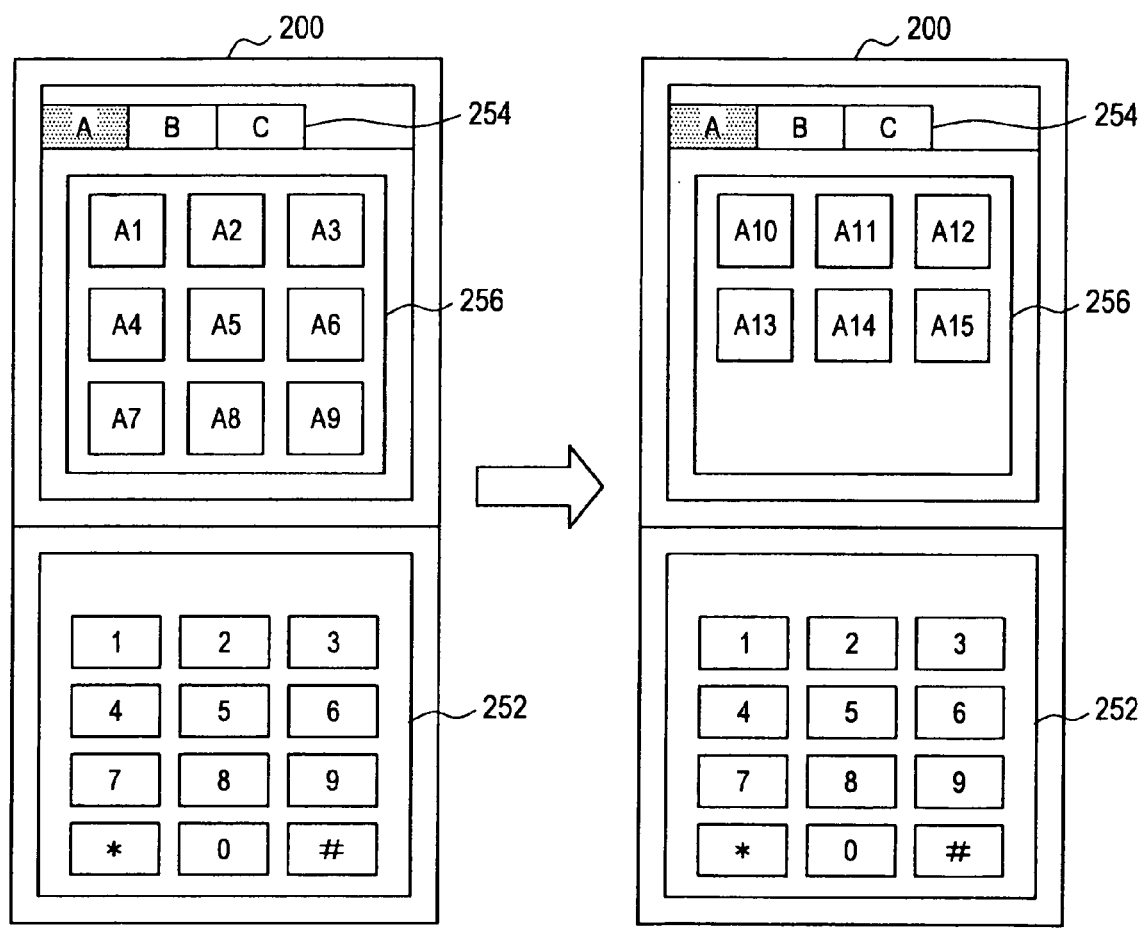
FIG. 12B is an explanatory view showing an example of an operation menu displayed on a portable terminal during content selection processing.

The procedure of content selection processing is described hereinafter with reference to FIG. 11 and FIGS. 12A and 12B. FIG. 11 is a sequence chart showing the procedure of content selection processing, and FIGS. 12A and 12B are explanatory views showing examples of the operation menu displayed on the portable terminal 200 during content selection processing. The content selection processing is processing for selecting the content on which the content processing and the unit information browsing processing are to be performed.

When the portable terminal 200 receives an instruction for content selection processing (S172), the portable terminal 200 displays the device designation list as in the case of the content registration processing, and a user designates the processing device 300 (designated device 300) from the device designation list (S174).

The portable terminal 200 transmits a transmission request for a content list, the terminal ID and the designated device ID to the ECG server 100 (S176). The ECG server 100 specifies the device control ID corresponding to the designated device 300 and the access destination of the device control server 400 based on the terminal ID and the designated device ID (S178). The ECG server 100 accesses the device control server 400 and transmits a transmission request for device information and the device control ID (S180). The device control server 400 extracts the device information of the designated device 300 stored in association with the device control ID (S182) and transmits it to the ECG server 100 (S184).

Receiving the device information, the ECG server 100 creates a content list including the content that can be processed by the designated device 300 based on the content information, the management information and the device information managed by the ECG server 100. The ECG server 100 first specifies the content processing executable by the designated device 300 based on the device information (S186).

If the designated device 300 is capable of processing (acquiring) the contents provided by various kinds of service models, the ECG server 100 specifies the available type of contents, such as contents of a terrestrial broadcasting, contents of BS broadcasting, contents of CS broadcasting, VOD contents and internet contents, for example (S188). Further, if the designated device 300 is capable of processing recorded contents recorded in the designated device 300, contents recorded in recording media and so on, the ECG server 100 specifies the available type of contents, such as recorded contents, DVD, CD and magnetic tapes, for example (S188).

If the available type of contents is specified, the ECG server 100 extracts the content that can be processed by the designated device 300 from the content information and the management information managed by the ECG server 100 (S190).

In the case of extracting a general content, the ECG server 100 specifies the content information containing the attribute information (a service model and a recording medium type) in conformity to the available type of contents among the content information managed by the ECG server 100, thereby extracting the relevant content. When extracting a time-scheduled content, the ECG server 100 extracts the content based on scheduling information contained in the content information in addition to the attribute information. On the other hand, in the case of extracting a particular content, the ECG server 100 specifies the content information of the content corresponding to the content ID based on the content ID contained in the management information and then extracts the content in the same manner as in the case of extracting the general content.

The ECG server 100 then creates the content list including the identification information (a content ID, a title etc.) contained in the content information of the extracted content and, when needed, the scheduling information (a provision channel, provision date and time etc.) and so on (S192), and transmits the created content list and the device information of the designated device 300 to the portable terminal 200 (S194). In the content list, the contents are classified according to a content type, provision date and time, a genre and so on, for example, based on the attribute information contained in the content information of the extracted content, and further according to preference information of a user.

The above-described content list is made up of the contents serving as the targets of the content processing by the processing device 300. At this time, the ECG server 100 may create the content list that includes the contents serving as the targets of the unit information browsing processing, which is described later. In this case, the ECG server 100 extracts the content corresponding to the content ID and the content corresponding to the unit ID from the content information managed by the ECG server 100 based on the content ID and the unit ID contained in the history information of a user, as described in detail later. Then, the ECG server 100 creates the content list that includes the identification information (a content ID, a title etc.) contained in the content information of the extracted content and so on and transmits the created content list to the portable terminal 200. A user can thereby select desired unit information from the content list based on the user's history information and browse it.

Because the unit information browsing processing is executed by the portable terminal 200 having the unit information browsing processing function without depending on the processing device 300, the ECG server 100 may create the content list including the contents not dependent on the processing device 300.

Receiving the content list, the portable terminal 200 displays the selection menu as shown in FIGS. 12A and 12B, for example (S196). The selection menu is composed of a classification information display region 254 to display the classification information of contents and a content information display region 256 to display content information. In the classification information display region 254, the classification information of contents, such as contents of a specific type, currently provided contents, recommended contents of this week, contents belonging to a specific genre and contents for the unit information browsing processing, for example, are displayed (in FIGS. 12A and 12B, the classification information is displayed in simplified form such as "A", "B" and "C"). In the content information display region 256, the identification information (title etc.) of the classified content and, when needed, the scheduling information are displayed. Then, according to the selection of the classification information, the identification information of the contents corresponding to the selected classification information is displayed in the content information display region 256.

In the example shown in FIG. 12A, the content information "A1", "A2", ... of the contents corresponding to the selected classification information "A" are sequentially displayed at given time intervals in the content information display region 256. Then, if given manipulation such as manipulation of a specific key 252 or manipulation of the display region is performed in the state where the content information is displayed, the content corresponding to the displayed content information is selected.

In the example shown in FIG. 12B, the content information "A1" to "A15" of the contents corresponding to the selected classification information "A" are displayed in the content information display region 256. The number of displayed content information is a predetermined number or less (which is nine in the example shown in FIG. 12B). If the number of the content information of the contents corresponding to the selected classification information is larger than the predetermined number, the predetermined number of content information "A1" to "A9" are displayed firstly, and, after a given period of time, the rest of the content information "A10" to "A15", the number of which is equal to or less than the predetermined number, are displayed.

Then, in the case where the portable terminal 200 has a touch panel, if the display region of specific content information on the touch panel is touched in the state where the content information is displayed, the content corresponding to the specific content information is selected (S204). If the content is selected, the content ID of the selected content included in the content list is specified as a selected content ID.

On the other hand, in the case where the portable terminal 200 does not have a touch panel, the content information are arranged and displayed in the content information display region 256 so as to correspond to the arrangement of the operation keys 252 (e.g. "1" to "9") of the portable terminal 200. Then, if a given key 252 is manipulated in the state where the content information is displayed (for example, the key "8" is manipulated when selecting the content "A8" in the state shown in FIG. 12B), the content corresponding to the content information placed corresponding to the position of the manipulated key 252 is selected. A user can thereby select the content easily by a simple manipulation based on the classification information.

In the case where the content information of the content that is time-scheduled and currently provided is displayed, when it becomes necessary to update the display of the selection menu as time elapses, the display is updated based on the scheduling information contained in the content information. In this case, if the provision end time of the content corresponding to the displayed content information comes or is approaching, the portable terminal 200 accesses the ECG server 100 and acquires the content information of the content to which the subsequent scheduling time period is assigned based on the scheduling information of the content to be updated (the content whose provision end time comes or is approaching) (S198, S200). Then, the portable terminal 200 updates the content list and also updates the display of the selection menu (S202).

A user can thereby use the content and the unit information by selecting the content using the portable terminal 200, without depending on a variety of contents and various kinds of processing devices 300. Because this eliminates the need for a user to make manipulation for each processing device 300 and further a manipulation method is unified, a user does not feel burdensome.

Content Processing

Figure 13:
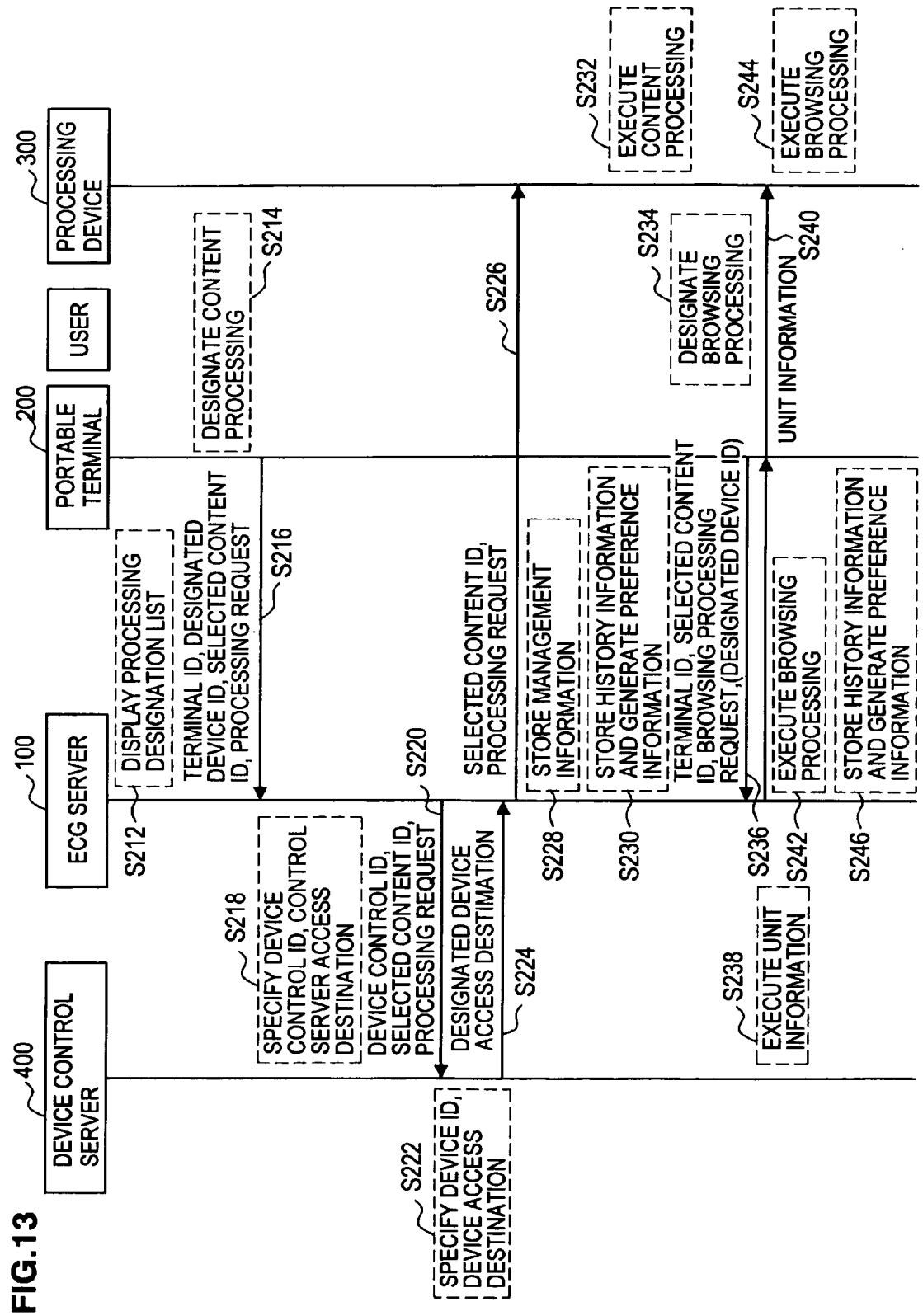
FIG. 13 is a sequence chart showing the procedure of content processing and unit information browsing processing.
Figure 14:
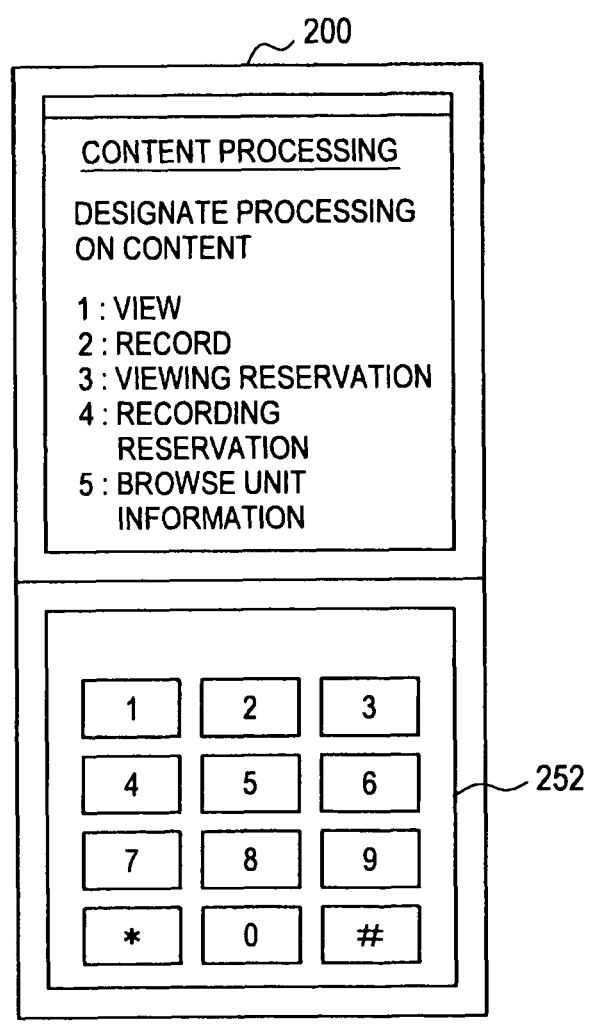
FIG. 14 is an explanatory view showing an example of an operation menu displayed on a portable terminal during content processing.

The procedure of content processing is described hereinafter with reference to FIG. 13 and FIG. 14. FIG. 13 is a sequence chart showing the procedure of content processing and unit information browsing processing. FIG. 14 is an explanatory view showing an example of the operation menu displayed on the portable terminal 200 during content processing. The content processing is processing performed on the content by the processing device 300, such as viewing, recording, reproduction, viewing reservation and recording reservation, for example.

If the content is selected, the portable terminal 200 displays a processing designation list that shows the processing which can be performed on the selected content by the designated device 300 according to need based on the device information and the content information as shown in FIG. 14 (S212). For example, the portable terminal 200 displays the processing designation list when a plurality of processing, such as viewing, recording, viewing reservation and recording reservation, can be performed on the selected content by the designated device 300 according to the combination of the designated device 300 and the selected content. On the other hand, the portable terminal 200 does not display the processing designation list when the processing to be performed on the selected content by the designated device 300, such as reproduction of the recorded content, is specified according to the combination of the selected content and the designated device 30, for example. Alternatively, the portable terminal 200 may display the processing designation list including the unit information browsing processing regardless of whether the processing by the designated device 300 is specified with respect to the selected content. After the processing designation list is displayed, a user designates the content processing or the unit information browsing processing for the selected content (S214). In the case where the processing by the designated device 300 is predicted in some measure, such as when the currently provided content is selected for the designated device 300 having the viewing function, when the content to be provided in the future is selected for the designated device 300 having the recording reservation function and when the content recorded in a recording medium managed by a user is selected for the designated device 300 having the reproduction function, those processing may be designated automatically instead of displaying the processing designation list.

After the processing to be performed on the selected content is designated, the portable terminal 200 transmits a processing request indicating the designated processing, the terminal ID, the designated device ID and the selected content ID to the ECG server 100 (S216). Receiving the processing request, the ECG server 100 specifies the device control ID and the access destination of the device control server 400 stored in association with the terminal ID based on the terminal ID and the designated device ID (S218) and transmits the device control ID, the selected content ID and the processing request to the device control server 400 (S220). On the other hand, if the unit information browsing processing is selected, the portable terminal 200 performs the unit information browsing processing, which is described later.

Receiving the processing request for the content processing, the device control server 400 specifies the device ID and the access destination of the designated device 300 stored in association with the device control ID based on the received device control ID (S222). Then, the device control server 400 transmits the processing request to the designated device 300 based on the access destination of the designated device 300. Receiving the processing request, the designated device 300 transmits the status information indicating the feasibility of the processing to the device control server 400.

The device control server 400 checks the status information, and if it receives positive status information, the device control server 400 transmits the access destination of the designated device 300 to the ECG server 100 (S224). On the other hand, if it receives negative status information or fails to receive the status information after a certain period of time has elapsed, the device control server 400 gives notification to the ECG server 100. In such a case, the ECG server 100 checks the existence of another device control ID stored in association with the terminal ID and if another device control ID is found, it accesses the device control server 400 having the device ID associated with the device control ID. Then, the ECG server 100 refers to the device information of an alternative processing device 300 having another device ID stored in association with the found device control ID, and if the alternative processing device 300 satisfies the processing request, it transmits the processing request to the alternative processing device 300 rather than to the designated device 300. Before accessing the alternative processing device 300, the ECG server 100 may give notification to the portable terminal 200 and confirm the access with a user of the portable terminal 200.

If the device control server 400 receives positive status information from the alternative processing device 300, the device control server 400 transmits the access destination of the alternative processing device 300, instead of the designated device 300, to the ECG server 100 as a target of indirect control by the portable terminal 200. On the other hand, in the case where the ECG server 100 does not receive positive status information from any of the processing devices 300 that satisfy the processing request, the ECG server 100 gives notification to the portable terminal 200 and notifies a user that the processing designated by the processing request is not executable. The following description is given on the assumption that the case where positive status information is received from the designated device 300.

Receiving the access destination of the designated device 300, the ECG server 100 accesses the designated device 300 based on the access destination of the designated device 300 and transmits the selected content ID and the processing request and, if necessary, the scheduling information to the designated device 300 (S226). If the processing request corresponds to the processing such as viewing reservation and recording reservation of the content, the ECG server 100 specifies the scheduling information contained in the content information of the selected content from the content information managed by the ECG server 100 based on the selected content ID.

After transmitting the processing request, the ECG server 100 stores the management information containing the selected content ID and the designated device ID with respect to each user in the case of transmitting a specific processing request such as recording and recording reservation, for example (S228).

Further, the ECG server 100 stores the selected content ID and the attribute information and, if necessary, the designated device ID and the processing request as history information in log format, with respect to each user (S230). At this time, the ECG server 100 may store the information that is stored as the history information as management information according to need. In such a case, the ECG server 100 confirms whether to store the history information as management information with a user via the portable terminal 200 in a given operation after storing the history information, for example, and if the user confirms that, the ECG server 100 transmits the selected content ID and the designated device ID contained in the history information as the management information with respect to each user.

Then, the ECG server 100 generates preference information of a user based on the history information (S230). The preference information may be information based on the frequency to select the contents having the specific attribute information or information based on the trend analysis of the history information, for example. When creating the content list, the ECG server 100 extracts the contents that match the preference information and classifies the contents based on the preference information.

A user can thereby easily select the content on which the specific processing is performed from the content list created to include the contents managed with respect to each user. Further, a user can easily select the content matching the preference from the content list created based on the preference information with respect to each user. Because the history information and the preference information are managed in a centralized manner by the ECG server 100 without depending on the processing device 300, a user does not feel inconvenience, which is different from the related art. Further, because the history information and the preference information are managed in a centralized manner, a user can select the content better matching his/her preference compared to the related art.

Receiving the processing request, the designated device 300 performs the content processing based on the processing request and, if needed, the scheduling information (S232). The designated device 300 performs processing such as viewing, recording, reproduction, viewing reservation and recording reservation, for example, on the selected content. When performing the processing on the content in a recording medium, the designated device 300 prompts a user to perform an operation such as setting of the recording medium according to need. In the case where the processing request corresponds to the processing such as viewing reservation and recording reservation, the designated device 300 notifies a processing result to the portable terminal 200 via the ECG server 100 upon completion of the content processing. A user can be thereby informed of the result of the content processing.

In addition to the content processing, the unit information browsing processing, which is described later, is performed in the portable terminal 200 and, selectively, in the processing device 300.

By the above procedure, a user can cause the designated device 300 to perform the content processing using the portable terminal 200.

Unit Information Browsing Processing

The procedure of unit information browsing processing is described hereinafter. The unit information browsing processing is processing for browsing the unit information of the content. The unit information browsing processing is performed between the ECG server 100 and the portable terminal 200 or the processing device 300.

Between the ECG server 100 and the portable terminal 200, browsing processing is performed during the content selection processing, the content processing which are described above, or content management processing and history processing which are described later. In this case, when the unit information browsing processing is designated (S234), the portable terminal 200 transmits a processing request for the browsing processing, the terminal ID and the selected content ID to the ECG server 100 (S236). Receiving the processing request, the ECG server 100 extracts the unit information of the selected content from the unit information managed by the ECG server 100 based on the selected content ID (S238) and provides the extracted unit information to the portable terminal 200 (S240). Receiving the unit information, the ECG server 100 executes the unit information browsing processing (S242).

On the other hand, between the ECG server 100 and the processing device 300, browsing processing is performed during the content processing. In this case, the portable terminal 200 transmits a processing request for the browsing processing, the terminal ID, the selected content ID and the designated device ID to the ECG server 100 (S236). Receiving the processing request, the ECG server 100 extracts the unit information of the selected content from the unit information managed by the ECG server 100 based on the selected content ID (S238) and provides the extracted unit information to the processing device 300 (S240). Receiving the unit information, the designated device 300 executes the unit information browsing processing (S244).

Acquiring the unit information, the portable terminal 200 and the designated device 300 display or reproduce the content information and the related information contained in the unit information based on the given display priority and the presentation type. Then, if a given operation is performed in the state where the content information and the related information are displayed, the portable terminal 200 performs execution of various kinds of processing such as display of detailed information, purchase processing and payment processing, for example, with the ECG server 100.

In the case of performing the browsing processing at the same time as the viewing/reproducing processing of the content, the portable terminal 200 may perform the browsing processing in link mode that switches the unit information to be browsed in conjunction with the switching of the content to be viewed/reproduced or in non-link mode that does not switch the unit information to be browsed in conjunction with the switching of the content to be viewed/reproduced. In such a case, when making a processing request for viewing/reproducing, the portable terminal 200 transmits a processing request for the browsing processing to the ECG server 100 when the link mode is selected and does not transmit a processing request when the non-link mode is selected, thereby performing the processing in accordance with the mode.

Because the unit information is updated according to the update of the content information and the related information, the latest unit information at the time when the ECG server 100 receives the processing request is provided to the portable terminal 200 and the designated device 300. Thus, the unit information of the content provided in the past contains the information updated after the provision of the content, for example. Further, the unit information of the currently provided content contains the information updated immediately before the provision of the content, for example. Furthermore, the unit information of the content to be provided in the future contains the latest information at the time of receiving the processing request.

A user can thereby browse the latest unit information at the time of executing the browsing processing without depending on the content provision time. Specifically, during reproduction of the recorded content, a user can browse the latest advertising information that is contained in the unit information instead of browsing the past advertising information that is contained in the content. Further, in the case of the scheduled content, a user can browse the latest information that is updated immediately before the provision of the content instead of the information that has been generally prepared before the content provision time, such as a program guide magazine and a program guide of a newspaper.

Further, the unit information may be managed separately into normal unit information with no limitations on the information contained in the unit information and limited unit information with limitations on the information. The normal unit information contains the variety of content information and the related information described above. On the other hand, the limited unit information contains only the limited information such as a summary of the content and introduction of the content to be provided next, for example. The ECG server 100 may provide the normal unit information to the portable terminal 200 that manages the viewing processing on the relevant content as the history information of a user or the portable terminal 200 that is currently making the designated device 300 perform the viewing processing on the relevant content, and provide the limited unit information to the other portable terminals 200.

The content provider 500 can thereby allow the ECG server 100 to provide different unit information to a user in accordance with the processing performed (being performed) on the content, and it is thus possible to prompt a user to view the content, for example, with the added value of the unit information.

After providing the ECG unit, if specific processing such as content purchase processing is performed by the portable terminal 200 about the related information, for example, the ECG server 100 may store the content ID of the processed content as the management information with respect to each user (S246).

Further, the ECG server 100 stores the unit ID of the ECG unit, the attribute information and so on as the history information in log format with respect to each user (S246). Then, the ECG server 100 generates preference information of a user based on the history information (S246). The preference information may be information based on the frequency to select the ECG unit having the specific attribute information or information based on the trend analysis of the history information, for example. When creating the content list, the ECG server 100 extracts the content information of the contents that match the preference information and classifies the contents based on the preference information.

Content Management Processing

Figure 15:
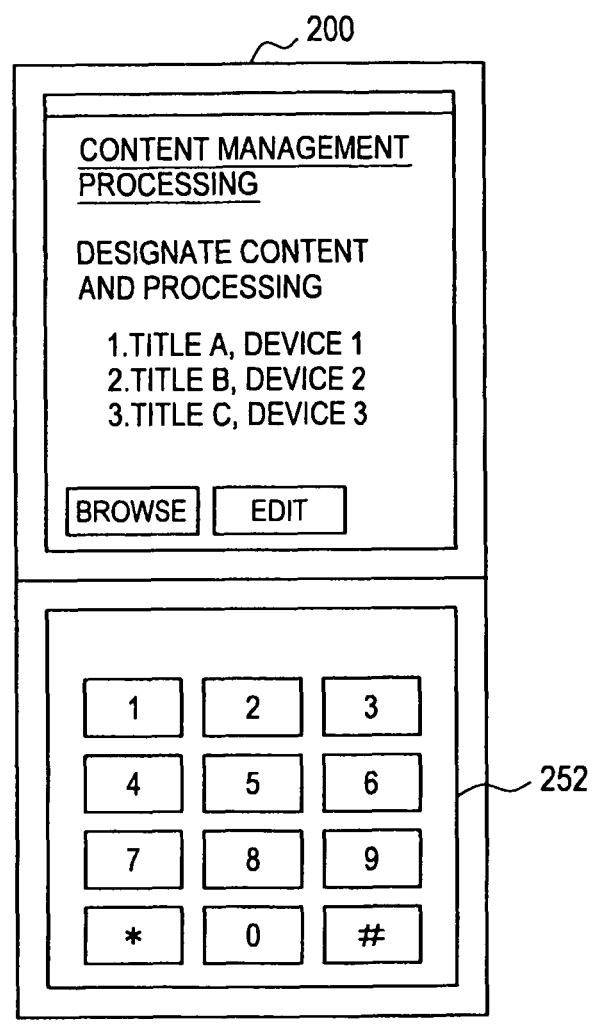
FIG. 15 is an explanatory view showing an example of an operation menu displayed on a portable terminal during content management processing.

The procedure of content management processing is described hereinafter with reference to FIG. 15. FIG. 15 is an explanatory view showing an example of the operation menu displayed on the portable terminal 200 during content management processing. The content management processing is processing for managing specific contents that are managed by the ECG server 100 with respect to each user.

Receiving an instruction for management processing from a user, the portable terminal 200 transmits a processing request and the terminal ID to the ECG server 100. Receiving the processing request, the ECG server 100 displays the management menu containing identification information (a title etc.) and device information (a device name etc.) that are managed as management information as shown in FIG. 15. If the management menu is displayed, a user selects a content and manipulates "browse" or "edit" button. If the "browse" button is manipulated, the portable terminal 200 performs the unit information browsing processing of the selected content. If the "edit" button is manipulated, the portable terminal 200 displays an editing menu or the like, and a user performs an editing operation such as deletion of management information, update of management information and addition of supplemental information. After the editing operation is performed, the portable terminal 200 transmits processing information containing the result of the editing operation to the ECG server 100, and the ECG server 100 updates the management information of the user based on the processing information.

History Processing

Figure 16:
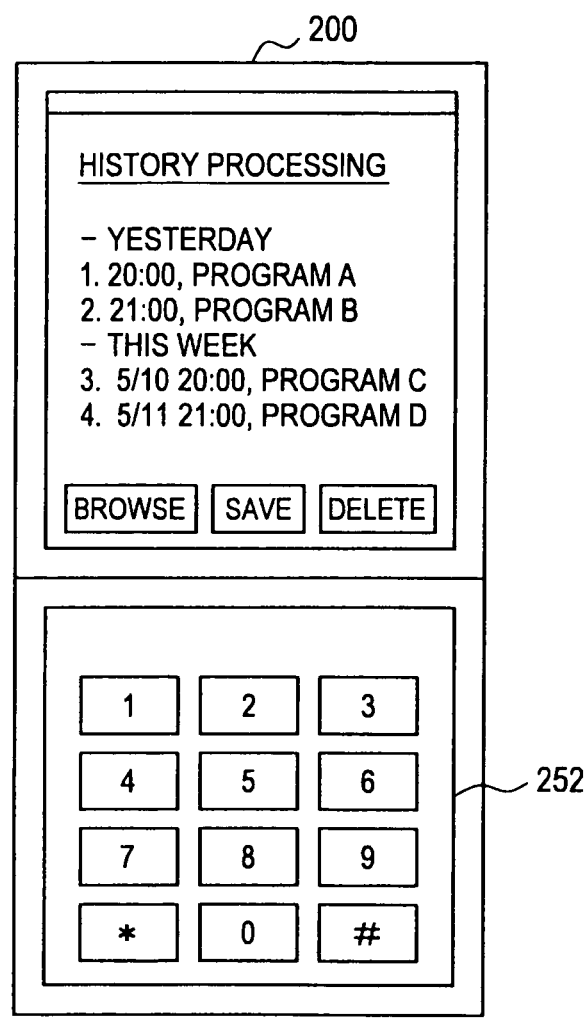
FIG. 16 is an explanatory view showing an example of an operation menu displayed on a portable terminal during history processing.

The procedure of history processing is described hereinafter with reference to FIG. 16. FIG. 16 is an explanatory view showing an example of the operation menu displayed on the portable terminal 200 during history processing. The history processing is processing for managing the history information stored with respect to each user by the ECG server 100 as the selection history of the content and the unit information selected to be processed by the portable terminal 200. The ECG server 100 stores only the history information within a given update period, such as one week, and automatically deletes the old history information, thereby updating the history information.

Receiving a processing request for the content processing, the ECG server 100 stores the selected content ID, the attribute information and, if necessary, the designated device ID and the processing request as the history information in log format, in association with the terminal ID. On the other hand, receiving a processing request for the unit information browsing processing, the ECG server 100 stores the selected content ID, the attribute information and, if necessary, the processing request as the history information in log format, in association with the terminal ID.

Then, receiving an instruction for the history processing from a user, the portable terminal 200 transmits a processing request and the terminal ID to the ECG server 100. Receiving the processing request, the ECG server 100 displays the management menu containing the identification information (a title etc.) of the content and the processing (or unit information browsing) date and time of the content that are stored as the history information as shown in FIG. 16. After the management menu is displayed, the user selects the content (or unit information) and manipulates "browse", "save" or "delete" button. If the "browse" button is manipulated, the portable terminal 200 performs the unit information browsing processing of the selected content. If the "save" button is manipulated, the ECG server 100 saves the selected history information regardless of the update of the history information. If the "delete" button is manipulated, the ECG server 100 deletes the selected history information regardless of the update period.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information providing apparatus included in a content processing system made up of the information providing apparatus, a portable information terminal, a content processing device and a device control apparatus, the device control apparatus, the content processing device, the information providing apparatus and the portable information terminal external to one another, connectable through a communication network, to process a content by at least one content processing device using the portable information terminal via the information providing apparatus and the device control apparatus, the information providing apparatus comprising:
 a storage device to store:
  content information containing unit identification information for identifying unit information of a content to be processed, management information for identifying a specific content managed with respect to each user of the portable information terminal, and
  the unit information containing the content information and, selectively, related information related to the content information in association with the content;
 a first device information receiving device to receive first device information for identifying the content processing device as a designated device to perform content processing from the portable information terminal, wherein the first device information is based on and corresponds to second device information for identifying a content processing device that can be the designated device, the second device information provided to the portable information terminal by the information providing apparatus, in which at the portable information terminal a device designation list is displayed indicating a content processing device indicated by the second device information as selectable as the designated device, wherein, during a content processing device registration processing performed before the first device information is received at the information providing apparatus from the portable information terminal, the second device information is generated and associated to third device control information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request to the information providing apparatus for the content processing device registration processing and receipt at the information providing apparatus of the terminal identification information from the portable information terminal, is verified by the device control apparatus against a device control apparatus identification information identifying the device control apparatus which is stored at the device control apparatus and provided from the information providing apparatus;

a second device information receiving device to receive the second device information, wherein the second device information further includes information for specifying content processing executable by the designated device from the device control apparatus;

a processor to:

extract the content information of the content processable by the designated device from the storage device based on the second device information, and extract the content information of the content processable by the designated device, among specific contents managed with respect to each user of the portable information terminal, from the storage device based on the second device information and the management information, and create a content list including the contents corresponding to the extracted content information and transmit the content list to the portable information terminal;

a content selection information transmitting/receiving device to receive content selection information for identifying a selected content selected based on the content list from the portable information terminal and transmit the content selection information to the content processing device via the device control apparatus;

a processing request transmitting/receiving device to receive a processing request indicating content processing to be performed on the selected content from the portable information terminal and transmit the processing request to the designated device via the device control apparatus; and wherein the processor is to extract the unit information of the selected content from the storage device based on the unit identification information contained in the content information of the selected content and provide the unit information to the portable information terminal, and to store the management information for identifying the selected content into the storage device.

2. The information providing apparatus according to claim 1, further comprising:

a search condition receiving device to receive a search condition of a registration content to be registered as a specific content managed with respect to each user of the portable information terminal from the portable information terminal, wherein the processor extracts the content information matching the search condition from the storage device and creates the content list including the content corresponding to the extracted content information and transmits the content list to the portable information terminal, the content selection information transmitting/receiving device receives the content selection information for identifying the registration content selected based on the content list from the portable information terminal, and the processor stores the management information for identifying the registration content into the storage device.

3. The information providing apparatus according to claim 2, wherein the storage device is to store the content selection information for identifying the selected content as history information with respect to each portable information terminal, wherein the processor extracts the content information of the selected content from the storage device based on the history information and creates the content list including the content corresponding to the extracted content information and provides the content list to the portable information terminal, the content selection information transmitting/receiving device receives the content selection information indicating the selected content selected based on the content list from the portable information terminal, and the processor portion extracts the unit information of the selected content from the storage device based on the unit identification information contained in the content information of the selected content and provides the unit information to the portable information terminal.

4. The information providing apparatus according to claim 3, wherein the storage device is to store preference information generated based on the history information with respect to each portable information terminal, and the processor creates the content list including the content corresponding to the extracted content information based on the preference information and transmits the content list to the portable information terminal.

5. The information providing apparatus according to claim 3, wherein the storage device stores, as the unit information of the content, first unit information containing the content information and, selectively, the related information related to the content information and second unit information containing limited information compared to the first unit information in association with the content, and stores the content selection information for identifying the selected content and a processing request indicating content processing performed on the selected content as the history information with respect to each portable information terminal, and the processor extracts the first unit information of the selected content from the storage device and provides the first unit information to the portable information terminal if the processing request indicating given content processing as the content processing performed on the selected content is stored in the storage device, and extracts the second unit information of the selected content from the storage device and provides the second unit information to the portable information terminal if the processing request indicating given content processing is not stored in the storage device.

6. The information providing apparatus according to claim 1, wherein
the unit information stored in the storage device is updated as appropriate, and
the processor extracts the updated unit information of the selected content from the storage device and provides the updated unit information to the portable information terminal.

7. The information providing apparatus according to claim 1, wherein
the processor extracts the unit information of the selected content from the storage device and provides the unit information to the designated device capable of displaying or reproducing the unit information.

8. A portable information terminal included in a content processing system made up of an information providing apparatus, the portable information terminal, a content processing device and a device control apparatus, the device control apparatus, the content processing device, the information providing apparatus and the portable information terminal external to one another, connectable through a communication network, to process a content by at least one content processing device using the portable information terminal via the information providing apparatus and the device control apparatus, the information providing apparatus storing content information containing unit identification information for identifying unit information of a content to be processed, storing management information for identifying a specific content managed with respect to each user of the portable information terminal, and storing the unit information containing the content information and, selectively, related information related to the content information in association with the content, the portable information terminal comprising:

a designated device information transmitting device to transmit first device information for identifying the content processing device as a designated device to perform content processing to the information providing apparatus, wherein the first device information is based on and corresponds to second device information for identifying a content processing device that can be the designated device, the second device information provided to the portable information terminal by the information providing apparatus, in which at the portable information terminal a device designation list is displayed indicating a content processing device indicated by the second device information as selectable as the designated device, wherein, during a content processing device registration processing performed before the first device information is received at the information providing apparatus from the portable information terminal, the second device information is generated and associated to third device control information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request to the information providing apparatus for the content processing device registration processing and receipt at the information providing apparatus of the terminal identification information from the portable information terminal, is verified by the device control apparatus against a device control apparatus identification information identifying the device control apparatus which is stored at the device control apparatus and provided from the information providing apparatus;

a content list receiving device to acquire a content list including the content corresponding to the content information of a content processable by a designated device and extracted based on the second device information indicating content processing executable by the designated device and the content corresponding to the content information of a specific content managed with respect to each user of the portable information terminal and processable by the designated device and extracted based on the second device information and the management information from the information providing apparatus;

a content selection information transmitting device to transmit content selection information for identifying a selected content selected based on the content list to the designated device via the information providing apparatus and the device control apparatus;

a processing request transmitting device to transmit a processing request indicating content processing to be performed on the selected content to the designated device via the information providing apparatus and the device control apparatus;

a processor to acquire unit information extracted as the unit information of the selected content based on the unit identification information contained in the content information of the selected content from the information providing apparatus and process the unit information; and a display/reproducing device to display or reproduce the content list and the unit information.

9. The portable information terminal according to claim 8, further comprising:
a search condition transmitting device to transmit a search condition of a registration content to be registered as a specific content managed with respect to each user of the portable information terminal to the information providing apparatus, wherein
the content list receiving device receives the content list including the content corresponding to content information extracted as the content information matching the search condition from the information providing apparatus, and
the content selection information transmitting device transmits the content selection information for identifying the registration content selected based on the content list to the information providing apparatus so as to store the management information for identifying the selected registration content into the information providing apparatus.

10. The portable information terminal according to claim 9, wherein
the content selection information for identifying the selected content is stored as history information with respect to each portable information terminal in the information providing apparatus,
the content list receiving device receives the content list including the content corresponding to content information extracted as the content information of the selected content based on the history information from the information providing apparatus, and the content selection information transmitting device transmits content selection information for identifying the selected content selected based on the content list to the information providing apparatus, the processor acquires unit information extracted as the unit information of the selected content from the information providing apparatus and processes the unit information, and the display/reproducing device displays or reproduces the content list and the unit information.

11. The portable information terminal according to claim 10, wherein preference information generated based on the history information is stored with respect to each portable information terminal in the information providing apparatus, and the content list receiving device receives the content list including the content corresponding to the extracted content information and created based on the preference information from the information providing apparatus.

12. The portable information terminal according to claim 8, wherein the display/reproducing device simultaneously displays the content information of a given number of contents, among the contents included in the content list, separated by common classification information, and the content selection information transmitting device transmits the content selection information indicating the content selected by an operation of an operating portion corresponding to each of the given number of displayed contents to the information providing apparatus.

13. The portable information terminal according to claim 8, wherein the unit information is updated as appropriate by the information providing apparatus, and the processor acquires unit information extracted as the updated unit information of the selected content from the information providing apparatus and processes the unit information.

14. A content processing device included in a content processing system made up of an information providing apparatus, a portable information terminal, the content processing device and a device control apparatus, the device control apparatus, the content processing device, the information providing apparatus and the portable information terminal external to one another, connectable through a communication network, to process a content by at least one content processing device using the portable information terminal via the information providing apparatus and the device control apparatus, and designated by first device information as a designated device to perform content processing by the portable information terminal, wherein the first device information is based on and corresponds to second device information for identifying a content processing device that can be the designated device, the second device information provided to the portable information terminal by the information providing apparatus, in which at the portable information terminal a device designation list is displayed indicating a content processing device indicated by the second device information as selectable as the designated device wherein, during a content processing device registration processing performed before the first device information is received at the information providing apparatus from the portable information terminals, the second device information is generated and associated to third device control information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request for the content processing device registration processing and receipt at the information providing apparatus of the terminal identification information from the portable information terminal, is verified by the device control apparatus against a device control apparatus identification information identifying the device control apparatus which is stored at the device control apparatus and provided from the information providing apparatus, the information providing apparatus storing content information containing unit identification information for identifying unit information of a content to be processed and storing management information for identifying a specific content managed with respect to each user of the portable information terminal, the content processing device comprising:

a content selection information receiving device to receive content selection information for identifying a selected content selected by the portable information terminal based on a content list including the content corresponding to the content information of a content processable by the designated device and extracted based on the second device information indicating content processing executable by the designated device and the content corresponding to the content information of a specific content managed with respect to each portable information terminal and processable by the designated device and extracted based on the second device information and the management information from the portable information terminal via the information providing apparatus and the device control apparatus;

a processing request receiving device to receive a processing request indicating content processing to be performed on the selected content from the portable information terminal via the information providing apparatus and the device control apparatus; and a processor to perform processing on the selected content based on the received content selection information and the received processing request.

15. The content processing device according to claim 14, wherein the information providing apparatus stores the unit information containing the content information and, selectively, related information related to the content information in association with the content, and the processor is to acquire unit information extracted as the unit information of the selected content based on the unit identification information contained in the content information of the selected content from the information providing apparatus and process the unit information; and the content processing device includes:

a display/reproducing device to display or reproduce the content and the unit information.

16. A device control apparatus included in a content processing system made up of an information providing apparatus, a portable information terminal, a content processing device and the device control apparatus, the device control apparatus, the content processing device, the information providing apparatus and the portable information terminal external to one another, connectable through a communication network, to process a content by at least one content processing device using the portable information terminal via the information providing apparatus and the device control apparatus, the information providing apparatus storing content information containing unit identification information for identifying unit information of a content to be processed and storing management information for identifying a specific content managed with respect to each user of the portable information terminal, the portable information terminal providing first device information for identifying a content processing device of the at least one content processing device as a designated device to the information providing apparatus, wherein the first device information is based on and corresponds to second device information identifying a content processing device that can be the designated device, the second device information provided to the portable information terminal by the information providing apparatus, in which at the portable information terminal a device designation list is displayed indicating a content processing device indicated by the second device information as selectable as the designated device, the device control apparatus comprising:
  a storage device to store the second device information, wherein the second device information further includes information specifying content processing executable by the content processing device, wherein, during a content processing device registration processing performed before the first device information is received at the information providing apparatus from the portable information terminal, the second device information is generated and associated to third control device information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request to the information providing apparatus for the content processing device registration processing and receipt at the information providing apparatus of the terminal identification information from the portable information terminal, is verified by the device control apparatus against a device control apparatus identification information identifying the device control apparatus which is stored at the device control apparatus and provided from the information providing apparatus;
  a device information transmitting/receiving device to transmit and receive the second device information to and from the designated device designated as the content processing device to perform content processing by the first device information from the portable information terminal and the information providing apparatus;
  a content selection information receiving device to transmit and receive content selection information for identifying a selected content selected by the portable information terminal based on a content list including the content corresponding to the content information of a content processable by the designated device and extracted based on the second device information of the designated device and the content corresponding to the content information of a specific content managed with respect to each portable information terminal and processable by the designated device and extracted based on the second device information and the management information to and from the information providing apparatus and the designated device; and
  a processing request transmitting/receiving device to transmit and receive a processing request indicating content processing to be performed on the selected content to and from the information providing apparatus and the designated device.

17. A content processing system made up of an information providing apparatus, a portable information terminal, a content processing device and a device control apparatus, the device control apparatus, the content processing device, the information providing apparatus and the portable information terminal external to one another, connectable through a communication network, to process a content by at least one content processing device using the portable information terminal via the information providing apparatus and the device control apparatus, wherein the information providing apparatus includes:
  a storage device to store:
    content information containing unit identification information for identifying unit information of a content to be processed, management information for identifying a specific content managed with respect to each user of the portable information terminal, and
    the unit information containing the content information and, selectively, related information related to the content information in association with the content;
  a first device information receiving device to receive first device information for identifying the content processing device as a designated device to perform content processing from the portable information terminal, wherein the first device information is based on and corresponds to second device information for identifying a content processing device that can be the designated device, the second device information provided to the portable information terminal by the information providing apparatus, in which at the portable information terminal a device designation list is displayed indicating a content processing device indicated by the second device information as selectable as the designated device,
  wherein, during a content processing device registration processing performed before the first device information is received at the information providing apparatus from the portable information terminal, the second device information is generated and associated to third device control information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request to the information providing apparatus for the content processing device registration processing and receipt at the information providing apparatus of the terminal identification information from the portable information terminal, is verified by the device control apparatus against a device control apparatus identification information identifying the device control apparatus which is stored at the device control apparatus and provided from the information providing apparatus;

a second device information receiving device to receive the second device information, wherein the second device information further includes information for specifying content processing executable by the designated device from the device control apparatus;

a processor to:

extract the content information of the content processable by the designated device from the storage device based on the second device information, and extract the content information of the content processable by the designated device, among specific contents managed with respect to each user of the portable information terminal, from the storage device based on the second device information and the management information, and create a content list including the contents corresponding to the extracted content information and transmit the content list to the portable information terminal;

a content selection information transmitting/receiving device to receive content selection information for identifying a selected content selected based on the content list from the portable information terminal and transmit the content selection information to the content processing device via the device control apparatus;

a processing request transmitting/receiving device to receive a processing request indicating content processing to be performed on the selected content from the portable information terminal and transmit the processing request to the designated device via the device control apparatus; and wherein the processor is to extract the unit information of the selected content from the storage device based on the unit identification information contained in the content information of the selected content and provide the unit information to the portable information terminal, and to store the management information for identifying the selected content into the storage device;

the portable information terminal includes:

a designated device information transmitting device to transmit the first device information to the information providing apparatus;

a content list receiving device to receive the content list from the information providing apparatus;

a content selection information transmitting device to transmit the content selection information to the designated device via the information providing apparatus and the device control apparatus;

a processing request transmitting device to transmit a processing request to the designated device via the information providing apparatus and the device control apparatus;

a second processor to acquire unit information extracted as the unit information of the selected content based on the unit identification information contained in the content information of the selected content from the information providing apparatus and process the unit information; and a display/reproducing device to display or reproduce the content list and the unit information, the content processing device includes:

a content selection information receiving device to receive the content selection information from the portable information terminal via the information providing apparatus and the device control apparatus;

a processing request receiving device to receive the processing request from the portable information terminal via the information providing apparatus and the device control apparatus; and a third processor to perform processing on the selected content based on the received content selection information and the received processing request, and the device control apparatus includes:

a second storage device to store the second device information of the content processing device;

a device information transmitting/receiving device to transmit and receive the second device information to and from the information providing apparatus and the designated device;

a content selection information receiving device to transmit and receive the content selection information to and from the information providing apparatus and the designated device; and a processing request transmitting/receiving device to transmit and receive a processing request information to and from the information providing apparatus and the designated device.

18. A non-transitory recording medium recorded with a computer-readable program executable by a computer for causing an information providing apparatus to execute an information providing method, the information providing apparatus included in a content processing system made up of the information providing apparatus, a portable information terminal, a content processing device and a device control apparatus, the device control apparatus, the content processing device, the information providing apparatus and the portable information terminal external to one another, connectable through a communication network, to process a content by at least one content processing device using the portable information terminal via the information providing apparatus and the device control apparatus, the information providing method comprising the steps of:

storing content information containing unit identification information for identifying unit information of a content to be processed;

storing management information for identifying a specific content managed with respect to each user of the portable information terminal;

storing the unit information containing the content information and, selectively, related information related to the content information in association with the content;

receiving, at the information providing apparatus, first device information for identifying the content processing device as the designated device to perform content processing from the portable information terminal, wherein the first device information is based on and corresponds to second device information for identifying a content processing device that can be the designated device provided to the portable information terminal by the information providing apparatus, in which at the portable information terminal a device designation list is displayed indicating a content processing device indicated by the second device information as selectable as the designated device, wherein, during a content processing device registration processing performed before the first device information is received at the information providing apparatus from the portable information terminal, the second device information is generated and associated to third device control information by the device control apparatus based on whether the third device information, in which the third device information is received by the device control apparatus from the information providing apparatus and is generated by the information providing apparatus and stored at the information providing apparatus in association with an access destination of the device control apparatus and terminal identification information for identifying the portable information terminal at the information providing apparatus in response to a request to the information providing apparatus for the content processing device registration processing and receipt at the information providing apparatus of the terminal identification information from the portable information terminal, is verified by the device control apparatus against a device control apparatus identification information identifying the device control apparatus, which is stored at the device control apparatus and provided from the information providing apparatus;

receiving the second device information, wherein the second device information further includes information specifying content processing executable by the designated device from the device control apparatus;

extracting the content information of the content processable by the designated device from the stored content information based on the second device information, and extracting the content information of the content processable by the designated device, among specific contents managed with respect to each user of the portable information terminal, from the stored content information based on the second device information and the management information;

creating a content list including the contents corresponding to the extracted content information and transmitting the content list to the portable information terminal;

receiving content selection information for identifying a selected content selected based on the content list from the portable information terminal and transmitting the content selection information to the content processing device via the device control apparatus;

receiving a processing request indicating content processing to be performed on the selected content from the portable information terminal and transmitting the processing request to the designated device via the device control apparatus;

extracting the unit information of the selected content from the stored unit information based on the unit identification information contained in the content information of the selected content and providing the unit information to the portable information terminal; and storing the management information for identifying the selected content.

\* \* \* \* \*